United States Patent [19]

Howell et al.

[11] 4,405,757

[45] Sep. 20, 1983

[54] MACROMOLECULAR COMPLEXES OF AMIDOCARBONYLIC WATER-SOLUBLE POLYMERS AND SQUARE PLANAR PLATINOUS AND EQUIVALENT ORGANOMETALLICS

[76] Inventors: Bobby A. Howell, 1948 Willow Dr., Mount Pleasant (County of Isabella), Mich. 48858; Erik W. Walles, 4369 E. Wing Rd., Mount Pleasant, Mich. 48858

[21] Appl. No.: 75,722

[22] Filed: Sep. 14, 1979

[51] Int. Cl.$^3$ .............................................. C08F 8/42
[52] U.S. Cl. .............................. 525/326.9; 525/359.2; 525/359.4; 525/370; 260/429 R; 260/430; 260/438.1; 260/439 R; 526/241
[58] Field of Search ................ 525/370, 359.2, 359.4, 525/336, 326.9; 260/326.22, 326.25, 429 R, 430, 438.1, 439 R; 524/161, 166, 204, 328, 395, 398

[56] References Cited

U.S. PATENT DOCUMENTS

| | | | |
|---|---|---|---|
| 3,904,663 | 9/1975 | Tobe | 424/287 |
| 4,137,248 | 1/1979 | Gale | 424/287 |
| 4,151,185 | 4/1979 | Allcock et al. | 525/370 |
| 4,219,650 | 8/1980 | Stockinger et al. | 260/326.22 |
| 4,255,347 | 3/1981 | Kidani | 424/203 |
| 4,256,652 | 3/1981 | Kidani | 260/429 R |

FOREIGN PATENT DOCUMENTS 2847664  10/1979  Fed. Rep. of Germany ...... 548/403

*Primary Examiner*—Paul R. Michl
*Attorney, Agent, or Firm*—Basile, Weintraub & Hanlon

[57] ABSTRACT

Unique, valuable and multifariously utile macromolecular complexes are comprised of: (i) non-ionic, amidocarbonylic, water-soluble polymers (and, for some embodimental purposes, the monomeric precursor(s) thereof), including such known materials as (poly)N-vinylpyrrolidone (i.e., "PVP") and/or (poly)N-vinyl-5-methyl-2-oxazolidinone (i.e., "PVO-M") and the hereinafter disclosed like(s) and/or equivalent(s) thereof which, for convenience, may be herein generically identified as "WSP"; and (ii) square planar configured platinous and, for instant applicancy, equivalently metalled organometallic compounds characterized in containing in ligandal inclusion an aromatic moiety from which depends and to which is connected at least a single distinctly polar substituent group (or "handle", as it were), such as an hydroxide (i.e., "—OH"), carboxylic acid (i.e., "—COOH") or sulfonic acid - (i.e., "—SO$_3$H") unit and/or equivalents thereof as herein disclosed which, for convenience, may for generic identification be herein called an "SPOM". The WSP:SPOM complex(es) are associated by non-ionic or other bonding attachment in the nature of hydrogen bonding and/or closely related electrostatic interaction between or through and to the polar substituent in the SPOM and the amidocarbonylic unit in the WSP.

43 Claims, 2 Drawing Figures

Fig. 1  Solubilities of

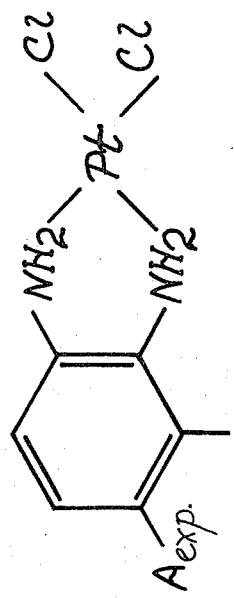

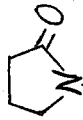

| -B exp. | -A exp. | DMF | MePyr | p-Dioxane | 0.03 M Phosphate Buffer, pH 7.0 | plus NaH$_2$PO$_4$ | plus (aq) NaOH | 1% aq. NaHCO$_3$ |
|---|---|---|---|---|---|---|---|---|
| -H | -H | +light blue | +blue | +yellow-green | i.s. | i.s. | i.s. | i.s. |
| -H | -OH | +pale green | +pale green+red | ∞light green+red | ∞light green | no change | dark green | dark green |
| -OH | -H | +blue | +blue-green+brown | ∞light green+brown | ∞light green | no change | meadow green | meadow green |
| -H | -COOH | +violet | +violet | +meadow+aquamarine blue | light yellow green | light yellow brown | brown | light green |
| | | | | ∞red | red | red | brown | brown |
| -H | -OCH$_3$ | +burgundy | +red | | | | | |

Notes: All of the compounds above are insoluble in water (pure) and in most common organic solvents.
DMF is dimethylformamide
MePyr is methyl pyrrolidone,
\+ indicates good solubility
∞ symbol indicates infinite solubility
i.s. stands for insolubility

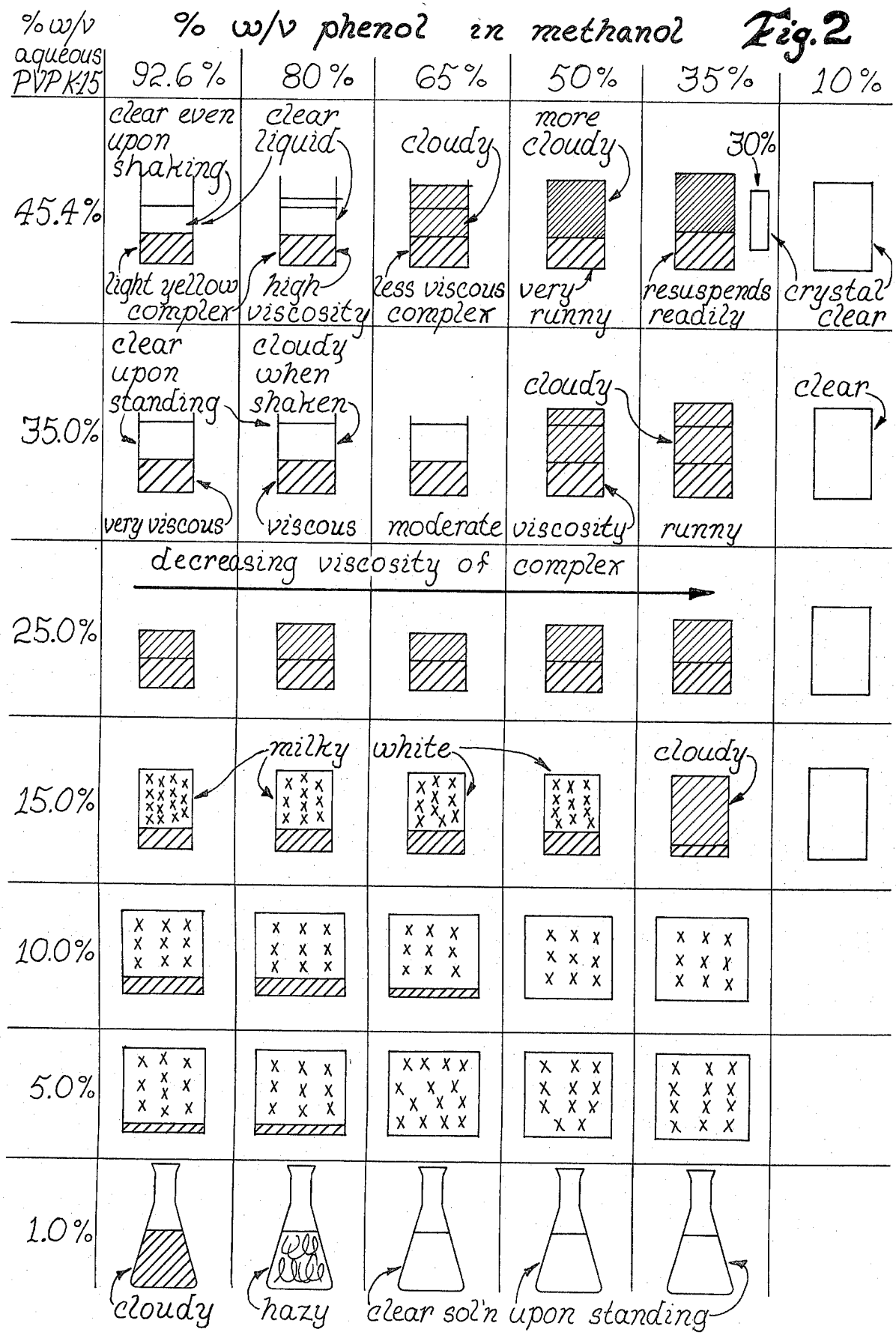

MACROMOLECULAR COMPLEXES OF AMIDOCARBONYLIC WATER-SOLUBLE POLYMERS AND SQUARE PLANAR PLATINOUS AND EQUIVALENT ORGANOMETALLICS

BACKGROUND OF THE INVENTION

Multitudinous natural and synthetic polymers are comprised, as important integral parts of at least portions of their constitution(s), of an essential amidocarbonylic moiety or unit of the Structure:

(A)

The Structure (A) unit is found either as a segment of a substituent extending from the polymer chain or "backbone" part of the chain continuation in the polymer or as a direct linear inclusion in the polymer backbone, per se. Illustrative of polymeric structures in which the amidocarbonylic unit is in and forms part of the chain itself are the various proteins, such as albumin, and peptides as well as synthetic proteins and the nylon-types of synthetic polymers. See, in this connection, References Numbers (i.e., "Refs. Nos.") 1,2 and 13 in the hereto appendixed LISTING OF REFERENCES Section of the instant Specification. The first-mentioned sort of substituent amidocarbonylic unit inclusion appear in the so-called pyrrolidone, cyclic carbamate and oxazoline WSP's as are well-exemplified in Refs. Nos. 5, 6, 8–12, 14–21, 24, 27 and 28.

Of particular interest and characterization are WSP materials of the following Formulae (I) and (II).

The structural representation of the Formula (I) polymers which encompasses their presently-contemplated breadth and scope (as produced from the monomeric precursors thereof) is:

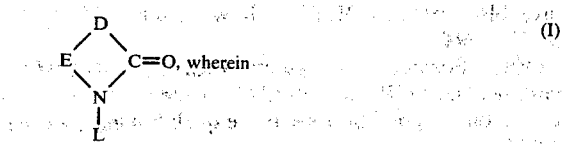
(I)

D is selected from the group consisting of oxygen (i.e., "O"), amino (i.e., "—NH—"), methylene (i.e., "—CH$_2$—"), alkyl-substituted methylenes (i.e., "—CHR—", in which R contains from 1 to about 3 carbon atoms as in methyl, ethyl, propyl and isopropyl), methylene carbonyl (i.e., "CH$_2$—$\overset{|}{\text{C}}$=O"), ethylene carbonyl (i.e., "C$_2$H$_4$—$\overset{|}{\text{C}}$=O") and amido anhydride (i.e., "O=$\overset{|}{\text{C}}$—NH—$\overset{|}{\text{C}}$=O"), all of which are obvious divalent groupings;
E is a divalent group which, in every occurrence and regardless of specific entity, introduces and provides either two or three carbon (i.e., "C") atoms at and in the indicated heterocyclic ring site between the nitrogen (i.e., "N") atom and the divalent D grouping therein and thereof and which is a moiety or unit representable by the Structure:

—(CHR'$)_{\overline{x}}$, (B)

in which x is an integer with a value of 2 or 3 and R' is hydrogen (i.e., "H") in both or all three of the interconnected Structure (B) units with the exception that in any one of them R' can be, alternatively and additionally to H in a single given instance, a substituent selected from the group consisting of hydroxyl, alkyl units containing from 1 to about 30 carbon atoms therein; hydroxyalkyl units containing the same possible number(s) of carbon atoms therein as said alkyl units (which is the applicable case for all other substituted alkyl groups here specified), phenylalkyl units, halophenylalkyl units, cycloalkyl units containing either 5 or 6 carbon atoms, alkyl-substituted 5 or 6 carbon cycloalkyl units, halogenated alkyl-substituted 5 or 6 carbon cycloalkyl units, haloalkyl units, phenyl units, alkyl-substituted phenyl units, halophenyl units, alpha-naphthyl and beta-naphthyl units and halogenated and/or alkyl-substituted alpha- and/or beta-naphthyls; and
L is selected from the group consisting of vinyl, allyl or isopropenyl which, by known addition polymerizations thereof, respectively become moieties of the respective Structures:

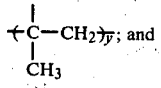
(C)

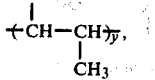
(D)

(E)

in which y is a plural integer which can have a value as high as 5,000 or even more excepting in the instances when the Formula (I) compound is monomeric wherein the value of y is 1 and the L Structures are, respectively:

$\overset{|}{(\text{CH}=\text{CH}_2)}$; (C')

$\overset{|}{(\text{CCH}_3=\text{CH}_2)}$; and (D')

$\overset{|}{(\text{CH}=\text{CHCH}_3)}$. (E')

Representative of groupings symbolized by E in the above Formula (I) are: ethylene (or dimethylene); hydroxyethylene; trimethylene; methylethylene (or isopropylene); hydroxymethylene; 1,2-dimethylethylene (or 2,3-n-butylene); 1,3-amylene; 2,3-amylene; 2,4-amylene; 1,2-hexylene; 2,3-hexylene; 2,4-hexylene; 3,4-hexylene; cyclohexyl ethylene; 3-cyclohexyl-1,2-propylene; 1-cyclohexyl-1,2-butylene; 1-cyclohexyl-1,3-butylene;

1-cyclohexyl-2,3-butylene; 2-cyclohexyl-1,2-butylene; 2-cyclohexyl-1,3-butylene; cyclobutylene; 3-cyclobutyl-1,2-propylene; 1-cyclobutyl-1,2-butylene; 1-cyclobutyl-1,3-butylene; 1-cyclobutyl-2,3-butylene; 2-cyclobutyl-1,2-butylene; 2-cyclobutyl-1,3-butylene; phenylethylene; 1-phenyl-1,3-propylene; 1-phenyl-1,2-propylene; 1,3-diphenyl-1,2-propylene; 2-phenyl-1,3-propylene; (1-p-chlorophenyl)trimethylene; 2(2,4,5-trichlorophenyl)-3,4-hexylene; 1-(p-chlorophenyl)-trimethylene; 1-(p-fluorophenyl)trimethylene; 1-(p-bromophenyl)trimethylene; 1-(p-iodophenyl)trimethylene; 2-(2,4,5-trichlorophenyl)-3,4-hexamethylene; 2-(2,4,5-trifluorophenyl)-3,4-hexamethylene; 2-(2,4,5-tribromophenyl)-3,4-hexamethylene; 2-(2,4,5-triiodophenyl)-3,4-hexamethylene; (p-tolyl)ethylene; 2-(o-tolyl)-1,3-trimethylene; alphanaphthylethylene; 1-beta-naphthyl-1,3-trimethylene; 1,2-phenylene; 4-chloro-1,2-phenylene; 1-fluoro-1,2-phenylene; 4-bromo-1,2-phenylene; 4-iodo-1,2-phenylene; and so forth with other like(s) and equivalent(s).

More precisely illustrative (but by no means limiting) of the heterocyclic entities which are includable in the Formula (I) materials of either monomeric or polymeric nature are those of the Structures:

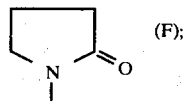

(2-pyrrolidinone)    (F);

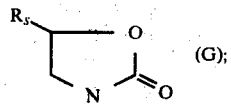

(2-oxazolidinone, in which $R_s$ can be H or a lower alkyl such as methyl, ethyl, etc. up to 6 or so C's)    (G);

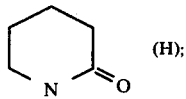

(2-piperidone)    (H);

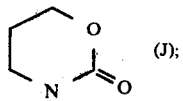

(2-oxazinidinone)    (J);

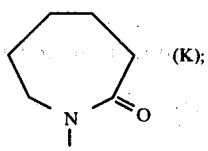

(caprolactam)    (K);

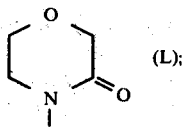

(2-morpholinone)    (L);

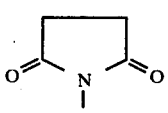

(succinimid)    (M);

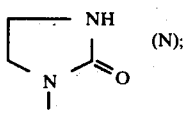

(imidazolidinone)    (N);

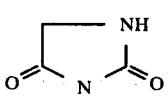

(hydantoin)    (O); and

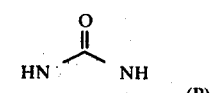

(cyanuric acid)    (P).

As indicated, polymers of Formula (I) materials usually contain a considerable plurality of interpolymerized repetitive units in their structure. To elucidate this using PVP as an example, the data in the following TABLE I is illustrative, wherein the K-value (according to Fikentscher) is given along with the number average molecular weight (i.e., "$M_n$") and the value of y in Structure (C) for each sample therein included.

TABLE I
MOLECULAR PROPERTIES OF VARIOUS PVP PRODUCTS

| K-value | $M_n$ | y |
|---|---|---|
| 15 | 10,000 | 90 |
| 30 | 40,000 | 360 |
| 60 | 160,000 | 1440 |
| 90 | 360,000 | 3240 |

This is at least approximately representative, taking into account specific molecular weight differences and other varying factors involved in the diverse species possible to embody, of other polymeric products of the formula (I); the same being in more-or-less approximate correspondence to the below-defined Formula (II) oxazoline polymeric products. While the K-values of the various contemplated WSP's can vary from about 2 to about 200, those having such values in excess of about 90 or so are sometimes relatively unattractively difficult to handle and employ insofar as concerns practical working and applicability purposes. Most frequently, WSP's having K-values in the neighborhood of 30 are most advantageous and desirable, taking all things into account, for utilization. On the other hand, certain varieties of cross-linked WSP's in which, in practical effect, there is an infinite (or at least realistically unmeasurable) molecular weight can sometimes find desirable utilization. While strictly speaking, such cross-linked products are almost invariably water-insoluble or of extremely limited aqueous solubility potential on an order approaching vanishing point dissolution capability in water, they can be and are considered WSP's within the frame of reference of the present contemplation. A good example of such a commercially-available water insoluble PVP is POLYCLAR-AT (Reg. TM) from GAF CORP.

Of the Formula (I) polymers ordinarily selected for employment, PVP and PVO-M are frequently favorite for reasons of good performance qualities and/or availability.

The solubility characteristics of PVP and PVO-M are interesting and of significance for various applicabilities. As is the case for molecular properties, the solubility features of both of these WSP's, while not strictly correlative in any general sense, are to lesser-or-greater degrees indicative of what can be expectable with at least the preponderance of the other possible Formulae (I) and (II) polymeric products.

While, excepting for cross-linked variations, PVP is generally soluble in water at literally all concentration and temperature levels, PVO-M has a peculiar and oftentimes valuable characteristic of inverse solubility with increasing water temperature. Thus, a K-30 PVO-M is generally soluble in water at 25° C. in literally all concentrations, especially in the range of 10 to 50 percent by weight (i.e., "wt.%"), based on total solution weight of the dissolved polymer. On the other hand, PVO-M is insoluble in water, especially in the same 10–50 wt.% range, when the temperature is 50° C. Aqueous solutions of PVO-M tend to become "cloudy" at the 37°–40° C. level with the polymer actually coming out of solution as a sticky mass at about 40° C. In other words, the "Cloud Point" of PVO-M in water is about 37° C.

By way of further illustration, the general solubilities of a K-30 PVO-M and a K-29-32 PVP in various alcohols, glycols, alkanolamines, acids, diamines, chlorinated hydrocarbons, aldehydes and other random solvent compounds when observed in about 0.5 wt.% concentrations under cool to hot conditions is observable as follows:

(1). They are soluble in 70 wt.% aqueous (i.e., "aq.") glycerine; acetic acid; thioglycolic acid; dichloromethane (i.e., "CH$_2$Cl$_2$"); trichloromethane (i.e., "CHCl$_3$"); salicylaldehyde; dimethylsulfoxide (i.e., "DMSO"); dimethylformamide (i.e., "DMF") and 36 wt.% aq. hydrochloric acid (i.e., "HCl").

(2). They are partially-soluble (meaning that they dissolve hot but tend to precipitate out of solution—or not dissolve therein—when cool) in methanol; ethylene glycol; propanoic acid; crotonaldehyde and p-dioxane.

(3). They are essentially insoluble (meaning very nearly, if not completely, so) in stearic acid; oleic acid; lauric acid; n-butyric acid; ethylene diamine; propylene diamine; diethylene triamine; carbon tetrachloride (i.e., "CCl$_4$"); ethylene dichloride (i.e., "C$_2$H$_4$Cl$_2$"); perchloroethylene; chlorothene; acetone; isobutyraldehyde; ether, more specifically diethyl ether (i.e., "(C$_2$H$_5$)$_2$O"); castor oil; olive oil; cottonseed oil; linseed oil; paraffin oil; methyl-n-amyl ketone; and methyl ethyl ketone.

(4). They are insoluble in ethanol; isopropanol; n-butanol; allyl alcohol; methyallyl alcohol; n-octanol-1; n-decyl alcohol; n-lauryl alcohol; glycerine; diethylene glycol; propylene glycol; tripropylene glycol; 1,3-butylene glycol; monoethanolamine; diethanolamine; and triethanolamine.

The compatibility of K-30 PVO-M with certain salt and other solutions is also meaningful along the above-indicated lines. This is demonstrable by using 1 part by volume (i.e., "vol.pt.") of 10 wt.% aq. PVO-M to which is added the desired aq. (meaning aqueous) solution of salt or other compound until notable turbidity results which indicates the limit of compatibility of the PVO-M with the given solution. Demonstration of this is set forth in the following TABLE II.

TABLE II

COMPATIBILITY OF 10 wt. % aq. PVO—M IN VARIOUS aq. SALT AND OTHER COMPOUND SOLUTIONS

| Wt. % In aq. Solution Of Particular Added Salt, Etc. | Turbidity Point At Given Vol. Pts. Added Solution (With Symbol "#" Indicating No Turbidity Or Precipitation After Charging Of 20 Vol. Pts. Of Involved Solution) |
|---|---|
| 1% Ferric Chloride | # |
| 50% Calcium Chloride | # |
| 20% Ammonium Chloride | # |
| 10% HCl | # |
| 10% Potassium Alum | 0.5 |
| 30% Sodium Chloride | 1.7 |
| 10% Sodium Bicarbonate (i.e., "NaHCO$_3$") | 0.1 |
| 10% Sodium Carbonate | 0.2 |
| 10% Potassium Oxalate | 0.3 |
| 10% Sodium Hydroxide (i.e., "NaOH" or "Caustic (Soda)") | 0.1 |
| 10% Potassium Hydroxide (i.e., "KOH" or "Caustic Potash") | 0.24 |

TABLE II-continued

COMPATIBILITY OF 10 wt. % aq. PVO—M IN VARIOUS aq. SALT AND OTHER COMPOUND SOLUTIONS

| Wt. % In aq. Solution Of Particular Added Salt, Etc. | Turbidity Point At Given Vol. Pts. Added Solution (With Symbol "#" Indicating No Turbidity Or Precipitation After Charging Of 20 Vol. Pts. Of Involved Solution) |
|---|---|
| 0% Methanol | # |
| 5% Resorcinol | 0.1 |
| 5% Tannic Acid | 0.1 |

As can be seen in TABLE II, the aq. PVO-M solution is compatible with some salts. It is precipitated by strong alkalis and by polyhydroxy compounds. No change with the phenolics appears even upon heating to 110° C. The PVO-M will very readily be precipitated by caustic; a semi-gel viscous mix appearing when only a few drops of 1 M aq. NaOH is added to the WSP solution.

The Formula (II) dimers and higher polymeric forms, including any polymeric (2-ethyl-2-oxazoline), in which the amidocarbonylic unit of the Structure (A) is an integral part of the polymer chain via its amide linkage, are generically representable by:

wherein Q is either a polyalkylene unit or merely methylene of the Structure:

or, alternatively, an alkyl-substituted unit of the Structure:

in which, the same as in R$_s$ is the foregoing Structure (G) for 2-oxazolidinone, the R$_s$ of Structure (T) is a lower alkyl unit containing from 1 to about 6 carbon atoms, such as methyl, ethyl, propyl, etc.; and R'' is a substituent containing from 1 to about 10 carbon atoms which can be alkyl; substituted—including substituent alkyl and halo groupings thereon—alkyl, cycloalkyl, including alkyl- and halo-substituted cycloalkysl, and aminoalkyl; and n is an integer with a value of from 2 to 5,000 and in some instances even several thousands higher so as to provide polymer products (when n begins assuming appropriate magnititudes) having Fikentscher K-values (as with PVP, PVO-M and other Formula (I) polymers) in the 1 or 2 to 200 and 200+ range. The Formula (II) polymerizates, as is known, are derived from polymerizable imide oxazoline entities (or monomeric precursors) of the Formula:

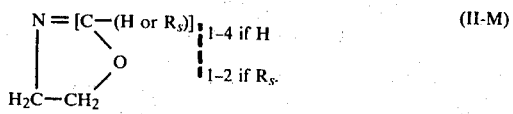

When WSP polymerizates of the Formulae (I) and (II) compounds are involved, they are usually homopolymeric in nature, such as PVP and PVO-M. However, they can be utilized in copolymer form as satisfactory WSP's. These, for example, can include copolymers or more than a single species of the Formula (I) or copolymers of more than a single species of the Formula (II-M) or copolymers of one or more of the Formula (I) monomers with one or more of the Formula (II-M) monomers. Copolymeric WSP's can also be comprised of copolymerizates of one or more of the monomeric species of the Formula (I) and/or one or more of the monomeric species of the (II-M) Formula and with other ethylenically (frequently monoethylenically) unsaturated monomers distinct from those of the Formulae (I) which are characterizable in being addition-copolymerizable by known techniques with monomeric N-vinylpyrrolidone and/or monomeric N-vinyl-5-methyl-2-oxazolidinone and/or monomeric precursors for 2-ethyl-2-oxazoline.

In the instances of such diverse WSP copolymers, it is advantageous for the resulting copolymer or multiply-diverse-monomer-containing copolymerizate to be comprised, based on total copolymer weight, of at least about 50 wt.% of at least one Formulae (I) and/or (II-M) monomer; with this more advantageously being at least about 75–80 wt.% of the latter amidocarbonylic group-containing or -providing monomer(s).

Illustrative of such diverse monomers adapted to be copolymerized with Formulae (I) and (II-M) monomerics (including mixtures of one or more thereof) are: 1,3-butadiene; 2,3-dimethyl-1,3-butadiene; isoprene; piperylene; 3-furyl-1,3-butadiene; 3-methyl-1,3-butadiene; chloro-1,3-butadiene; 2-bromo-1,3-butadiene; 2-chloro-3-methyl-1,3-butadiene; styrene; p-chlorostyrene; p-methoxystyrene; alpha-methylstyrene; vinylnaphthalene; acrylic acid; methacrylic acid; methyl acrylate; ethyl acrylate; methyl alpha-chloroacrylate; methyl methacrylate; ethyl methacrylate; butyl methacrylate; methyl ethacrylate; acrylonitrile; methacrylonitrile; methacrylamide; methyl isopropenyl ketone; methyl vinyl ketone; methyl vinyl ether; vinyl-ethinyl alkyl carbinols; vinyl acetate; vinyl chloride; vinylidene chloride; vinylfurane; vinylcarbazole; N-vinyl-3-morpholine; vinyl formate; maleic aced; itaconic acid; fumaric acid; crotonic acid; allyl alcohol; vinyl fluoride; 2-chloroally alcohol; 1-allyloxy-3-chloro-2-propanol; N-vinylsuccinimide; N-tertiarybutyl acrylamide; N-tertiaryoctyl acrylamide; 1,2-dichloropropene-2; 1,2-dichloropropene-1; tri-, tetra- and pentachlorostyrene; o-, m- and p-methyl styrene; p-tertiarybutylstyrene; p-isopropylstyrene; p-phenyl styrene; p-benzoyl styrene; p-cyanostyrene; m-nitrosostyrene; m-trifluoromethylstyrene; m-fluorostyrene; m-tertiarybutyl styrene; stearoylstyrene; olcoylstyrene; linolcylstyrene; alpha-vinylnaphthalene; beta-vinylnaphthalene; 1-(alpha-naphthyl)-propene-1; 2-(alpha-naphthyl)-propene-1; 2-(alpha-naphthyl)-butene-2; 3-(alpha-naphthyl)-pentene-2; 2-bromo-4-trifluoromethylstyrene; beta-bromo-alpha,betadiiodostyrene; beta-bromo-p-methylstyrene; beta-bromo-p-dinitrostyrene; m-secondarybutylstyrene; alpha,beta-dibromostyrene; beta,beta-dibromostyrene; alpha-chloro-2,4,6-trimethylstyrene; alpha-chloro-2,3,4,6-tetramethylstyrene; beta-chloro-o-nitrostyrene; 1chloro-2-(p-tolyl)-1-butene; 4-(1-chlorovinyl)-anisole; 2-(1-chlorovinyl)-4-methylanisole; 1-chloro-4-vinylnaphthylene; 4(1-chlorovinyl)-2-isopropyl-5-methylanisole; 4(2-chlorovinyl)-2-isopropyl-5-methylanisole; p-cyclohexylstyrene; 2-ethyl-1-phenyl-1butene; 3,5-diethyl styrene; 4-fluoro-3-trifluoromethyl-alphamethylstyrene; alpha,alpha-trifluoro-m-propenyl-toluene; 2-isopropyl-5-methyl-4-vinyl anisole; 2-methyl-3-phenyl-2-pentene; methyl styryl ether; N,N-dimethyl-m-vinylaniline; 2-(alpha-naphthyl)-2-butene; 1,1-diphenylethylene; propenyl benzene; stilbene; 1-vinylacenaphthene; p-vinylbenzonitrile; p-vinylbiphenyl; 2-vinylfluorene; 6-vinyl-1,2,3,4-tetrahydro-naphthalene; p-vinylphenetole; vinylbutyrate; vinylbenzoate; vinylquinoline; 2-vinylpyridine; 2-methyl-5-vinylpyridine; 4-vinylpyridine; N,N-diallylacrylamide; diallylamine; diallylmethacrylamide; 2,5-dimethyl-3,4-dihydroxy-1,5-hexadiene; 2,5-dimethyl-2,4-hexadiene; divinylbenzene; the divinyl ester of diethylene glycol; trivinylbenzene; 2,7-dimethyl-1,7-octadiene; p-diisopropenylbenzene; 1,3,5-triisopropenylbenzene; p,p'-diisopropenyldiphenyl; 1,1,3,3-tetrallyl-1,3-propanediol; 1,1,3,3-tetramethallyl-1,3-propanediol; 4,6-dimethyl-4,6-dihydroxy-1,8-nonadiene; 2,4,6,8-tetramethyl-4,6-dihydroxy-1,8-nonadiene; nonadiene-1,8; 2,8-dimethylnonadiene -1,8; acetyl triallylcitrate; ethylene; propylene; maleic anhydride; and so forth and so on.

A considerable number of various types and styles of square planar organometallic compounds are known in the art. Good illustrations and representations of these are to be found in Refs. Nos. 23, 25, 29 and 30, especially insofar a concerns those involving platinum as the metallic constituent thereof. They are also nicely illustrated in FIG. 1 of the accompanying Drawing, as the same is explained in the following PARTICULARIZED DESCRIPTION OF THE INVENTION Section of this Specification wherein some known and some novel SPOM's are included. They are also brought forth in connection with Formula (III)/ said Section. The bulk of these, however and insofar as is relevant to anything public known prior to the making of the invention constituting the essence and genesis of the subject matter of the present Application, did not involve ligandal inclusions of aromatic moieties in their structures and none concerned any such SPOM with aromatic ligands with polar substituent group attachments made thereon and affixed thereto.

Complex formations with various complectant and complectate ingredients and combinations are also well known and practiced in the prior art. These, quite frequently, involve phenolic complectates with a variety of complectant substances including, in particular, PVP, PVO-M and the like. Refs. Nos. 1–9, 11–13, 15–17, 19–22 and 26–28 are in one or another way and for one or another purpose germane to this topic.

Thus, it is known that certain substituents on aromatic ring structures, particularly in phenols, are capable of forming stable complexes with polymers that contain the Structure (A) amidocarbonylic moiety. Demonstrative of this, gelatin (a natural protein), polyglycine (a synthetic protein), nylon and PVP have even had rather extensive commercial use to precipitate and isolate from beer the undesired, for one or another reason, tannins, leucoanthocyanins and many other phenolic-type materials and phenols found in the brew as made as the water-insoluble polymer:phenol complex instrumental for the purifying separation.

In further connection with the foregoing BACKGROUND OF THE INVENTION dissertation, the basic principles and limitations of WSP's, SPOM's and various complexes and complex formations are so widely known and comprehended by those skilled in the art that above, and beyond what is here previously set forth, further fundamental expostulation of or elaboration on same is not herein made; the same being unnecessary for thorough understanding and recognition of the advance contributed by and with the instant development and the many benefits obtainable by practice and embodimentations in keeping with the present invention.

Nonetheless, nothing in applicable prior art appears to realistically concern itself with nor suggest, teach, lead to or provide the instantly-contemplated, unique and estimable WSP:SPOM complexes in the way so crucially direct and indigenously advantageous as in the present contribution to the art.

FIELD AND PURVIEW OF THE INVENTION

The present invention concerns itself with advantageous and novel WSP:SPOM complexes which are readily prepared, of good and reliable stability, handled for use with attractive facility, dependable for performance in and for applications and workings thereof and therewith and generally quite worthwhile with regard to superiority for many things when measured against and in comparison with analogous heretofore-known complexes and other WSP- and/or SPOM-containing compositions.

The achievement and provision of all indicated are amongst the principle aims and objectives of the invention; with even more and additionally other benefits and advantages derivable in and from present practice and embodimental possibilities appearing and becoming more evident in the ensuring description and Specification.

SUMMARY OF THE INVENTION

The present invention, and the founding discovery on which it is based, broadly pertains to highly improved, advantageous and unprecedented, optimumly prepared and functional WSP:SPOM complexes all in primary and elementary pursuance with and as is set forth and delineated in the following First Claim hereof which is here reitterated and incorporated by reference. In this connection, the appropriate Formulae (I) and/or (II) WSP's to utilize have been described in the foregoing BACKGROUND OF THE INVENTION Section of this Specification while the suitable SPOM materials to employ are fully particularized in the following PARTICULARIZED DESCRIPTION OF THE INVENTION Section of the Specification in especial narration associated with the Formula (III) organometallics.

Suitable materials for utilization and complexing; as well as working proportional details, preparation conditions and parameters and other significant specifics of the invention are also set forth and emphasized in the following Specification.

ILLUSTRATED EXEMPLIFICATION OF THE INVENTION

The portrayals in the two (2) FIGS. of the accompanying Drawing generally illustrate somewhat isolated aspects of factors of significant bearing on practice and comprehension of the present invention. In these:

FIG. 1, in a tabular presentational viewing, illustrates and compares certain of the solubility characteristics of various SPOM components; not all of which are adaptable for use in practice of the invention and certain of which are known while the remainder demonstrated, whether or not fit for present practice, are novel; and FIG. 2, in fanciful schematic portraying, shows views of the complexing propensities of a system not in accordance with the present invention (namely, PVP and phenol) which, nonetheless is of salient helpfulness to illustrate and grasp what occurs in the complexing phenomenon and, more in point, predictive of the likely expectable and implications derivable therefrom for and in practice of the present invention.

In this, FIGS. 1 and 2 are each to a noteworthy extent relatively self-explanatory thus being apt to well facilitate better understanding in conjunction with the following disclosure for assimilation with full purchase of what they represent and nicely indicate.

PARTICULARIZED DESCRIPTION OF THE INVENTION

The present invention, in basic essence and substance, involves innovative and ameliorated WSP:SPOM complexes comprising and made up of:

(a). As the componential complectant thereof and therein, a WSP that is a monomer of appropriately constituted form of polymer (the latter most frequently being of preferential choice) of a Formula (I) and/or Formula (II) compound, including mixtures thereof and even with other complectant substances, as are fully delineated in the foregoing BACKGROUND OF THE INVENTION Section of this Specification, with PVP and/or PVO-M highly desirable and exceptionally advantageous to incorporate for the purpose; with (via interconnection and complex-forming association by non-ionic effective bonding attachment in the nature of hydrogen bonding and/or very nearly like and similative electrostatic interaction possibilitating the joinder between or through and to the polar subsituent(s) in the coalesced SPOM)

(b). As the componential complectate thereof and therein, an SPOM that is of the general Formula:

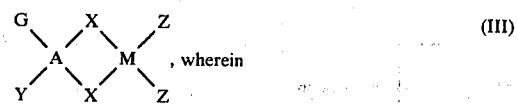

(III)

"M" is a purposively valenced Group IB and/or Group VIIIB metal in the Periodic Table Of Elements according to Mendelyeev that is selected from the group consisting of: platinum having an oxidation number of two (i.e., "Pt(II)"); palladium having an oxidation number of two (i.e., "Pd(II)"); nickel having an oxidation number of two (i.e., "Ni(II)"); rhodium having an oxidation number of one (i.e., "RH(I)"); iridium having an oxidation number of one (i.e., "IR(I)"); gold having an oxidation number of three (i.e., "Au(III)"); and copper having an oxidation number of two (i.e., "Cu(II)") with, as indicated, all of them being effectively tetravalent insofar as concerns and enables ligandal connection(s) thereto in the organometallic structure above formulated so that for this purpose they have and must be able to accept 8 orbital electrons from ligands at the interconnecting level of the metallic atoms;

"Z" is a mono- or divalent unit when both Z's are taken as one radical which can be independently constituted and selected when it is monovalent that is taken from the Group consisting of those structured and/or existant as follows (including, as noted, mixtures of monovalent members thereof):

—Cl (chloro); (AA)

—Br (bromo); (BB)

—F (fluoro) (CC)

—I (iodo); (DD)

—NH₃ (ammonia); (EE)

—NO₃ (nitrate); (FF)

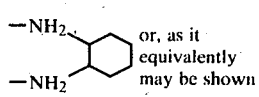 or, as it equivalently may be shown 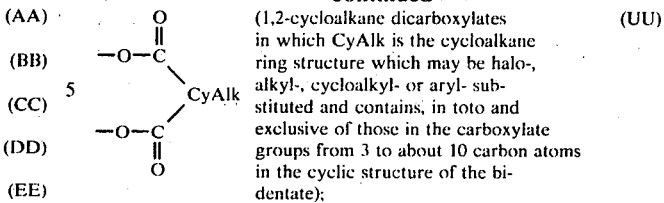 (GG)

(1,2-diaminocyclohexane);

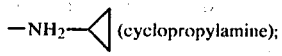 (cyclopropylamine); (HH)

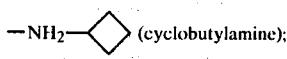 (cyclobutylamine); (JJ)

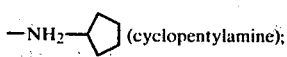 (cyclopentylamine); (KK)

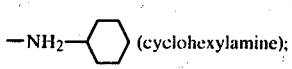 (cyclohexylamine); (LL)

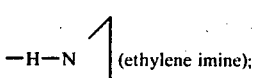 (ethylene imine); (MM)

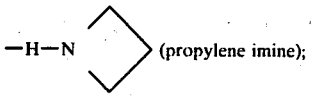 (propylene imine); (NN)

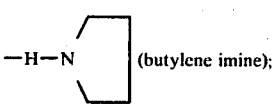 (butylene imine); (OO)

—NH₂ (substituted amines wherein $R_s$ is a lower alkyl as in Structures $R_s$ (G) and (T) above); (PP)

H₂NCH₂CH₂NH₂ (ethylene diamine); (QQ)

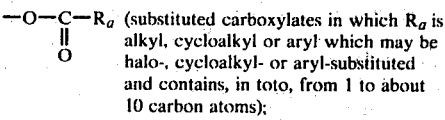 (substituted carboxylates in which $R_a$ is alkyl, cycloalkyl or aryl which may be halo-, cycloalkyl- or aryl-substituted and contains, in toto, from 1 to about 10 carbon atoms); (RR)

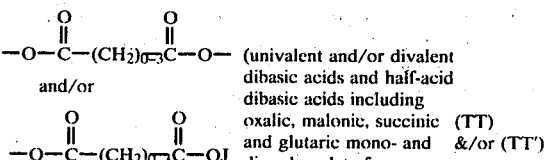
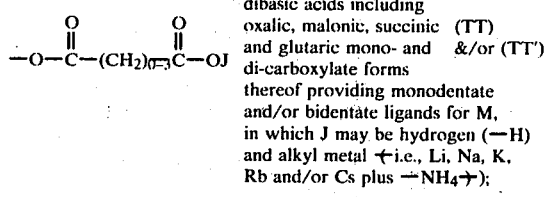
(univalent and/or divalent dibasic acids and half-acid dibasic acids including oxalic, malonic, succinic (TT) and glutaric mono- and &/or (TT') di-carboxylate forms thereof providing monodentate and/or bidentate ligands for M, in which J may be hydrogen (—H) and alkyl metal (-i.e., Li, Na, K, Rb and/or Cs plus —NH₄+);

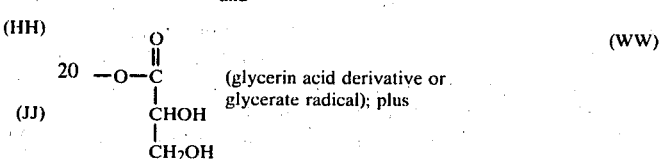 (1,2-cycloalkane dicarboxylates in which CyAlk is the cycloalkane ring structure which may be halo-, alkyl-, cycloalkyl- or aryl- substituted and contains, in toto and exclusive of those in the carboxylate groups from 3 to about 10 carbon atoms in the cyclic structure of the bidentate); (UU)

(1,2- aryl dicarboxylates in which Ar is an aromatic radical which may be halo-, alkyl-, cycloalkyl- or aryl- substituted and contains, in toto and exclusive of those in the carboxylate groups from 6 to about 12 carbon atoms in the aromatic structure of the bidentate); and (VV)

—O—C(=O)—CHOH—CH₂OH (glycerin acid derivative or glycerate radical); plus (WW)

all (or any mixture of same or with monovalent members of the Group Z) of the members listed in the following for the Group Y; plus further any, as bidentates in ligandal attachment to M of the aromatic and heterocyclic members listed in the following for the moiety A including same with substituent attachment(s) of said members of the Group Y and/or substituent attachment(s) of the members listed in the following for the Group G;

"A" is an aromatic or heterocyclic entity in bidental ligandal attachment with the divalent X units, as hereinafter defined, which X units may actually constitute the nitrogen inclusions in the entity when A is heterocyclic so as to actually be part of the heterocyclic structure and which A entity must have at least one substituent thereon selected from the members of said Group Y, which entity A is a member of the Group consisting of those structured and/or existant as follows:

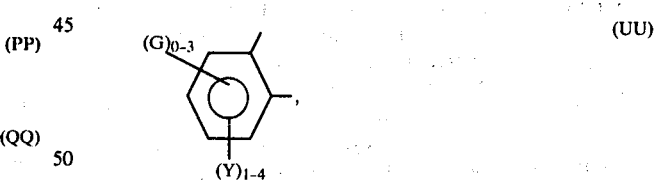 (UU)

(a substituted benzene in meta connection to each of the respective X units); — but see Footnote —

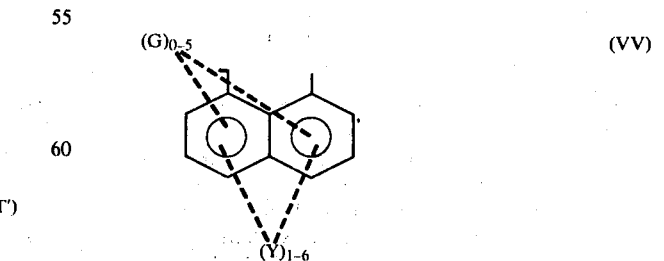 (VV)

(a substituted naphthalene in 1,8- or other meta-connection to each of the respective X units); — but see Footnote —

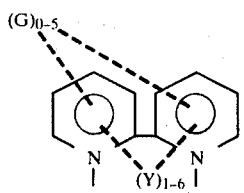

(WW)

a substituted bipyridyl in either attachment to the respective X units through connection with the heterocyclic nitrogens in the bipyridyl or which X units are actually the heterocyclic nitrogens in the bipyridyl); — but see Footnote — and

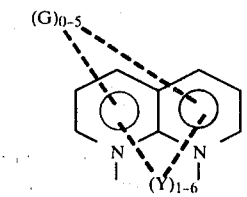

(XX)

(a substituted 1,8-naphthyridine in either attachment to the respective X units through connection with the heterocyclic nitrogens in the 1,8-naphthyridine or which X units are actually the heterocyclic nitrogens in the 1,8-naphthyridine); — but see Footnote —

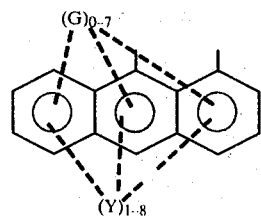

(VVA)

(a substituted 1,9- or other meta-connection to each of the respective X units of and from anthracene); — but see Footnote —

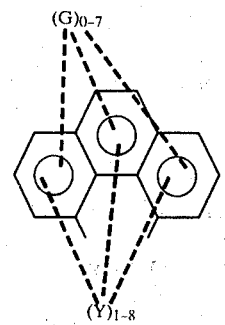

(VVP)

(a substituted 4,5-or other meta-connection to each of the respective X units of and from phenanthrene); — but see Footnote —

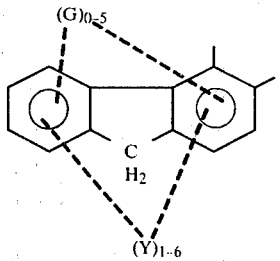

(VVF)

(a substituted 1,2-fluorene (also known as o-biphenylenemethane, diphenylenemethane or 2,2'-methylenbiphenyl) or other meta-connection to each of the respective X units); — but see Footnote — plus as well as

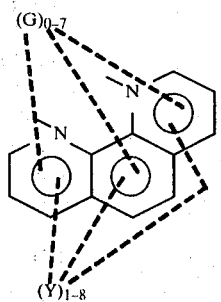

(XXP)

(a substituted 4,5-phenanthroline (also known as o-phenanthroline or 1,10-phenanthroline in either attachment to the respective X units through connection with the heterocyclic nitrogens in the 4,5-phenanthroline or which X units are actually the heterocyclic nitrogens in the 4,5-phenanthroline) — also seeing Footnote, Footnote: Regarding the above-given descriptions for the connection particulars associated with the above Formulae (UU), (VV), (WW), (XX), (VVA), (VVP), (VVF) and (XXP), it must be recognized and accorded proper comprehension that these as noted are for the likely more typical and/or usually encountered arrangements. However, as will be readily apparent to and appreciable by those skilled in the art and as is evident from relatively cursory introspection, many other architectural possibilities exist for obtaining effective and satisfactory joinders and linkages between the entity A and the linking unit(s) X associated with M. These are above and beyond the cases wherein one or both of the X's (be they identical or diverse, independently-selected) become part of or actually constitute one or both of the N's in the heterocyclic molecules of Structures (WW), (XX) and/or (XXP) and, for that matter, certain exceptionally reactive C's, including but not restricted to those adjacent the bridge, in various of the aromatics of the other hydrocarbon ring structures depicted. This, by the way, is equally applicable to the connections with M insofar as concerns the Z units when any of the entity A members become bidentate units involving attachment to or inclusion of one or both of the same or independently-selected and different but so-coalesced Z units. Thus, it is not infrequently of advantage and even possible preference for one or both of either the G's and/or the Y's to be, per se, either or both of the X's (or Z's). In such occurrences, an ortho- connected arrangement to any of the ring structures (including to the C's instead of one or both of the N's in heterocyclics) can be quite desirable and is readily effected within reasonable limits of synthesizability. Likewise, whether meta-, as ordinarily predominantly implemented, or ortho- arranged, X (or Z) can be actually-attached and as herein defined groups connecting in respective terminal embracing mechanisms through analogously distinct G's or Y's securing A(s) in the SPOM structure and definitely tending to ease realization of ortho- connections.

in which Structures (WW), (XX) and XXP), as noted therewith and as indicated in the foregoing commencement of definition of the entity A, both of the X units in the Formula (III) may additionally actually be (or, in effect, be replaced by) the nitrogens in the indicated heterocyclic structures so that the X's then are N's which possibility is the same as is also indicated in the foregoing definition of the Z units in the Formula (III) so that both X's and/or both Z's may be constituted as the N's of said Structures (WW), (XX) and (XXP) when the entity A is employed in strict accordance with the representation of Formula (III) insofar as concerns the X units and/or when said Structures are utilized as a bidentate ligand with and/or in which both of said Z units are connected (it being well worth the particular mention at this point that the Structure (XXP) 4,5-phenanthrolines are particularly attractive and effective in attachment in the Formula (III) in the instances when M is either Cu(II) or Ni(II));

"Y" is a monovalent substituent attached to the entity A in the above-given Formula (III) which is of a distinctly and actively polar nature when utilized in either hydrogen terminating (or acidifiant in character) form or when employed in salt form with terminating atoms of any of the alkali metals in Group IA of said Mendelyeev Periodic Table of Elements or, in function and effect quite like that of an alkali metal, an ammonium radical, —NH$_4$ (all of which are strongly basic in character and quite effective for complexing purposes with the WSP in the presence of water) with said Y being a member of the Group consisting of those structured and/or existant as follows (understanding that when more than a single Y unit is attached to A the totality of the plurality thereof may be independently selected and be comprised of mixtures of more than one of the various members of the Group), all of which Y members are pursuant to the foregoing indication adapted to complex strongly with the WSP in the WSP:SPOM complex(es) of the invention:

—OH (hydroxyl);  (AAA)

—SH (sulfhydryl);  (BBB)

—SO$_3$H (sulfonic acid);  (CCC)

—NO$_2$ (nitro);  (DDD)

—NH$_2$ (amine);  (EEE)

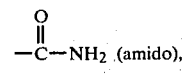 (carboxylic acid derivative or carboxylate);  (FFF)

-continued

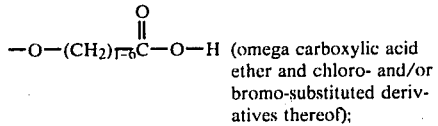 (omega carboxylic acid ether and chloro- and/or bromo-substituted derivatives thereof);  (GGG)

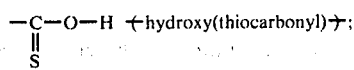 (mercapto carbonyl);  (HHH)

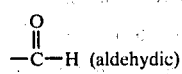 (hydroxy(thiocarbonyl));  (JJJ)

—C—H (aldehydic)  (KKK)
 ‖
 O

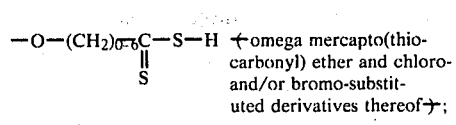 (omega mercapto(thio-carbonyl) ether and chloro- and/or bromo-substituted derivatives thereof);  (LLL)

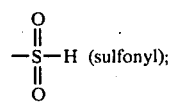 (sulfonyl);  (MMM)

—N—H (imino);  (NNN)
 |

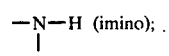 (thiosulfonic acid(s));  (OOO)

—N—C—N—H (substituted ureido);  (PPP)
 |

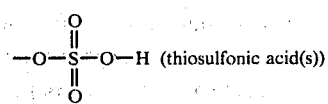 (ureylene);  (QQQ)

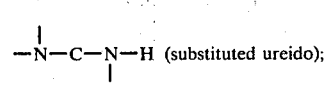 (substituted ureylene, in which R$_5$ is a lower alkyl as in Structures (G), (T) and (PP) above); and  (RRR)

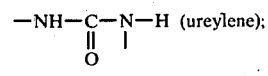 (amido),  (SSS)

in which Structures (AAA) through (SSS) any of the replacable, proton-doning hydrogens may be substituted with an alkali metal and/or ammonium as explained in connection with the symbol J in the foregoing Structure (TT), thus yielding a salt form of the Y unit in which salt form said Y members are likewise well adapted to strongly complex with the WSP:SPOM complex(es) of the invention; "X" is a divalent linking unit which makes paired connection, with reference to the Formula (III), between M and the entity A and which is selected so as to be identical or independently different (excepting when both X's are the N's in the heterocyclic Structures (WW) and (XX) above given for the entity A) from members of the group consisting of: bivalent oxygen (i.e., "—O—"); bivalent sulfur (i.e., "—S—"); bivalent amine (i.e., "—NH$_2$—"); and derivative bivalent forms (i.e., with the active h removed so as to leave a free valence in its place) of any of the Structures (CCC), (DDD), (FFF), (GGG), (HHH), (JJJ), (KKK), (LLL), (MMM), (NNN), (OOO), (PPP), (QQQ), (RRR) and (SSS) in connection with the above-defined unit effectively divalent whether or not proton attachment remains or is not present Y; and "G" is a monovalent substituent also attached to the entity A in Formula (III) which, when present in any plurality may be (like with Y) independently selected and in mixed character as to the employed members of its Group and which can be either polar or non-polar in nature, and is a member selected from the Group consisting of: hydrogen (H); any of the monovalent members of the above-listed Group for Z which include, namely, Structures (AA), (BB), (CC), (DD), (EE), (FF), (HH), (JJ), (KK), (LL), (MM), (NN), (OO), (PP), (QQ)-when in monovalent form substituent attachment, (RR), (TT') and (WW); any of the members of the above-listed Group for Y which include, namely, Structures (AAA), (BBB), (CCC), (DDD), (EEE), (FFF), (GGG), (HHH), (JJJ), (KKK), (LLL), (MMM), (NNN), (OOO), (PPP), (QQQ), (RRR) and (SSS); and, with the exception of the already-included hydroxide covered by Structure (AAA), any of the substituents represented by R' in Structure (B) described in connection with Formula (I).

Prominant and favored for employment in preparing the SPOM's of the Formula (III) in practice of the present invention are, insofar as concerns structural component selection(s);

(c). For M, Pt(II) although the others mentioned are all also nicely attractive for utilization. Surprisingly, the non-included Group VIII metals (i.e., iron-Fe, rubidium-Ru, osmium-Os and cobalt-Co) have an unpredictable and undesirable propensity to form octahedral structures unwanted for present purposes. Likewise, silver (i.e., "Ag") of the Group IB metals has an overwhelming tendency when utilized for organometallic compounds to provide those which contain only two ligand substituents.

(d). For entity A, those of the Structure (UU), especially phenolic, benzoic acid and benzene sulfonic acid derivatives. In this, it is usually advantageous for the Y substituent to occur in a meta-relationship position with respect to the divalent X ligandal connections attached to ortho-positioned-relationship with one another on the aromatic nuclei, particularly when only a single Y unit is included in the structure. Such locating of Y tends to greatly minimize, if not entirely avoid, complexing of the SPOM with the WSP for steric reasons. Nonetheless, ortho-positioned arrangements for Y generally are satisfactorily operable and, in many instances, do not really pose any spatial problems pertinent to the complexability of the involved SPOM and WSP components. Along this line, a plurality of Y units attached to entity A in the SPOM structure obviously fortifies the complexing potential of the SPOM due to the greater number of polar "handles" thereby made available for the purpose. By analogy, a similar complexing enhancement is achieved when both of the Z units constitute part of a bidentate ligand arrangement involving attachment thereby of Structures (VV) and/or (WW) in the molecular arrangement of the SPOM; more polar "handle" availability being so created. In this connection, it is ordinarily prudent when a Structure (VV) or (WW) ligandal arrangement with the Z units is effected to take care in the selection of the G substituents thereon if any are present. This is particularly the case with regard to aromatic possibilities amongst the members of the G Group. Aromatic units extending from the Z ligandal arrangement in the Formula (III) SPOM's are adversely inclined to more or less polymerize the thereby provided SPOM's into disadvantageous and overly complex structures which are generally undesirable and unwanted because of their hindering influence on the complexing potential of the SPOM.

(e). For ligandal substituents Z especially when not combined into or converted to make up a bidentate structure (although, strangely enough, this does not appear to be the case when ethylene diamine of the Structure (QQ) is utilized in that way), chloro, bromo, ammonium and substituted amine(s) of the respective Structures (AA), (BB) (EE) and (PP).

(f). For the bivalent linking units X, bivalent amine, $-NH_2-$, analogous to the Structure (EEE), bivalent carboxy derivatives analogous to the Structure (FFF) and other bivalent derivatives containing oxygen and or sulfur directly in the linking bridge and making direct connection(s) therefrom to either or both of the A entities and M.

It is clear in this connection, as above mentioned and known and appreciated by those skilled in the art, the linking units X may be considered as "effectively" divalent in cases when a proton remains attached in the structure. In some cases, as with bivalent oxygen (i.e., "—O—") from hydroxide and bivalent sulfur (i.e., "—S—") from sulfhydryl, it is most likely that no proton remains in the bivalent unit. In other cases, as with effectively divalent forms of Structure (FFF) through (NNN) and (PPP) through (SSS) the hydrogen (or "H" proton) probably remains in the "—OH" or equivalent moiety such as "—SH", especially when attached to such an "M" as Pt(II), constituent of Formula (III). Nonetheless, the bridging X units are in any event "effectively" divalent insofar as is important for chemical connection purposes. In the cases of the thiosulfonic acid divalent units derived from Structure (OOO), proton probably leaves readily when the bridging X is composed thereof. Along this line, the thiosulfonic acids comtemplated obviously include the, strictly speaking, thiosulfonic-O-acid derivatives of that specifically shown in Structure (OOO) as well as the obvious equivalents thereof such as effectively divalent derivatives of

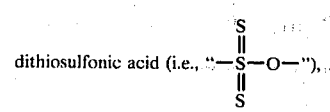

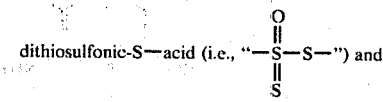

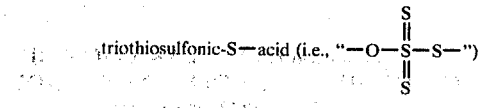

as is apparent in and evident from such eminently established authoirty as John H. Fletcher, Otis C. Derner and Robert B. Fox at page 147 of their work entitled NOMENCLATURE OF ORGANIC COMPOUNDS published in 1974 by the AMERICAN CHEMICAL SOCIETY of Washington, D.C.

(g). For the monovalent substitutent G when it is not a hydrogen but a more pronounced and spatially extending substituent, hydroxyl of the Structure (AAA), carboxylate of the Structure (FFF), amine of the Structure (EEE), chloro and bromo of the respective Structures (AA) and (BB) and alkyl, substituted alkyl, aryl and substituted aryl as defined for radical R' in the Structure (B). In this, however, the precaution pointed out in the above Paragraph (d) should be taken into account if not completely observed when R' is aromatic extending from any ligandal arrangements of combined Z units with and/or into entity A components in that portion of the SPOM molecule.

The SPOM's utilized in practice of the present invention are conveniently and advantageously preparable according to (but with some extension and variation of) the teachings and disclosure of Ref. No. 23, notably at pg. 418 thereof. The Ref. No. 23 reactions are exemplified by:

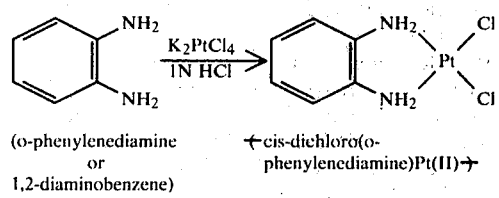

(o-phenylenediamine or 1,2-diaminobenzene)   +cis-dichloro(o-phenylenediamine)Pt(II)+

Deducible from the above, the following Equations illustrate typical and satisfactory preparations for the production of several different desirable SPOM's for subsequent complexing utilization pursuant hereto:

Equation (1)-PREPARATION OF
CIS-DICHLORO(3,4-DIAMINOPHENOL)Pt(II)
(i.e., SPOM "m-OHPt")

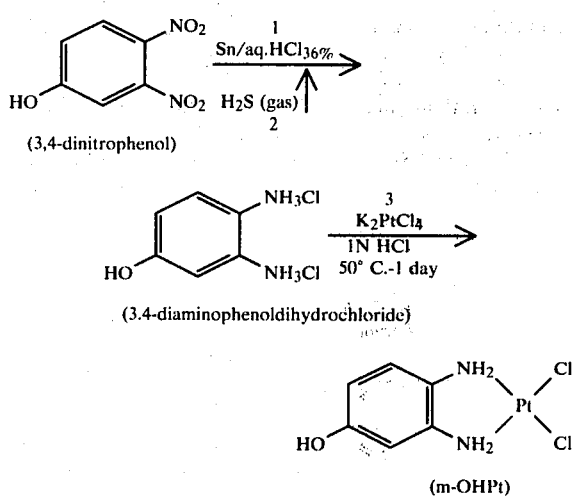

(m-OHPt)

Equation (2)-PREPARATION OF
CIS-DICHLORO(2,3-DIAMINOPHENOL)Pt(II)
(i.e., SPOM "o-OHPt")

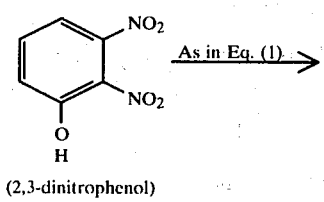

(2,3-dinitrophenol)

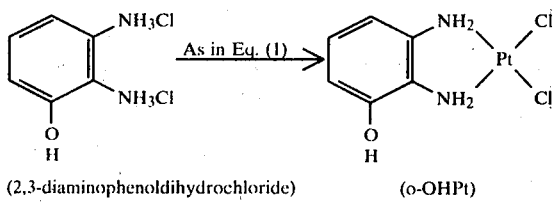

(2,3-diaminophenoldihydrochloride)        (o-OHPt)

Equation (3)-PREPARATION OF
CIS-DICHLORO(3,4-DIAMINOBENZOIC
ACID)Pt(II)-(i.e., SPOM "m-COOHPt")

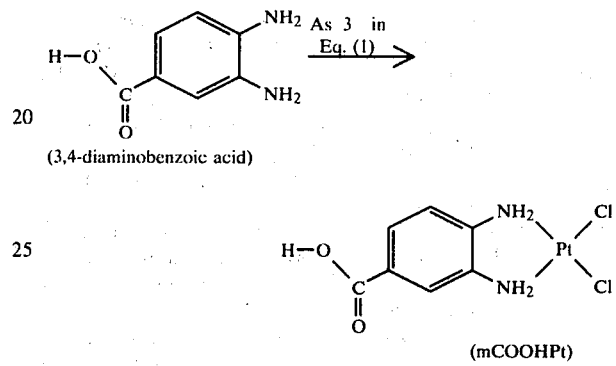

(mCOOHPt)

Equation (4)-PREPARATION OF
CIS-DICHLORO(3,4-DIAMINOBENZENE
SULFONIC ACID)-(i.e., SPOM "m-SO3HPt")

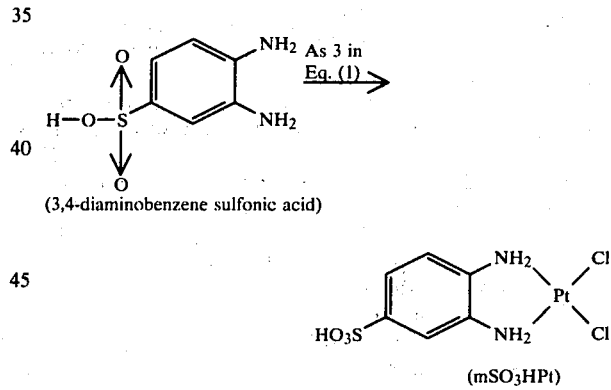

(mSO3HPt)

The presently-contemplated SPOM materials are, in general, quite difficulty soluble in most solvents, especially those of the more popular and commonly employed types. For example, they are literally without meaningful exception insoluble in water (particularly water in a relatively pure form) and most of the common and widely-employed organic solvents. There are, nonetheless, confutative and non-conformant species variation exceptions to this generality with respect to aqueous solubility capabilities of certain SPOM's. One of these, hereinafter illustrated particularly in connection with the Variation Of The First Illustration demonstration in the following WORKING EXEMPLIFICATIONS OF THE INVENTION Section of this Specification, is the SPOM types having sulfonic acid Y substituent(s) therein. Another, as explained in the following disclosure attendant the illustration of Equation (5) and as also brought forth in the Third Illustration of said WORKING EXEMPLIFICATIONS . . . Section, stems from the formation of solubilizing salt compositional derivatives of the SPOM's. Even when a solvent is capable of dissolving an SPOM, the actual solute concentrations are generally on a very low order of magnitude; this ordinarily being on the order of from about $10^{-3}$ to about $10^{-4}$ molar.

The above-indicated generality is nicely demonstrated in FIG. 1 of the accompanying Drawing. In descending order of the tabular portrayal: the first SPOM is cis-dichloro(o-phenylenediamine)Pt(II)-i.e., SPOM "m-HPt", the preparation of which is above illustrated in connection with the exemplification from Ref. No. 23 and an SPOM which has no applicability in practice of the present invention; the second is m-OHPt; the third is o-OHPt; the fourth is m-COOHPt; and the SPOM in the bottom line is cis-dichloro(3,4-diaminomethoxybenzene)Pt(II)-i.e., SPOM "m-OCH$_3$Pt", a novel composition which finds no applicability in practice of the present invention due to the lack of polarity in the substituent methoxy but which is included in the showing of FIG. 1 for purposes of having a broader solubility illustration therein. The solvents utilized for the represented solubility screenings, namely DMF, N-methyl-2-pyrrolidone (i.e., "MePyr") and p-dioxane, are amongst those considered to be good for dissolution of SPOM's. The solubility screenings from which the results indicated in FIG. 1 are demonstrated were done by making up the involved solutions) or attempted solutions) on a weight (of SPOM) per unit volume (of solvent) basis (i.e., "w/v" measurement). In the solubility testings illustrated by FIG. 1, the w/v ratio was in each instance 8 parts by weight of the particular SPOM being tested for 100 parts by volume of the involved solvent.

The dramatic change in solubility by attachement of substituents to the o-phenylenediamine unit of the involved SPOM's is very evident in FIG. 1. Also, the effect of pH control is also nicely illustrated therein. The NaH$_2$PO$_4$ and caustic additions were made in quantities sufficient to secure a pH in the neighborhood of 7, as was also the case for the sodium bicarbonate additions. The improvement in many instances of solubility with pH adjustment is readily apparent in the FIG. 1 tabulation, with the noted color changes indicating changes in the actual SPOM solute concentration in the solutions being analyzed. For completely explanatory purposes, the "phosphate buffer" indicated in FIG. 1 is an equilibrating mixture of H$_2$PO$_4$ and HPO$_4$.

While varying SPOM's according to the Formula (III) will, as is expectable, exhibit varying solubility characteristics, the addition of a small amount of basic material to any SPOM solution being attempted will usually improve the solubility effect. Numerous basic substances may be employed for this purpose, including those very strong in character such as caustic soda, caustic potash and so forth and those of less intense basic nature than the caustic alkalis such as soluble carbonates and bicarbonates, certain inorganic oxides and many organic base compositions such as alkaloids, diphenylmethylammoniumhydroxide, "Schiff's Base" preparations and so forth as well as ammonia and ammonium hydroxide reagents. There is, of course, no limitation on the basic materials to employ for SPOM solution facilitation, so long as they do not react chemically in an undesirable way therewith.

Without there being any absolute generality thereabout, the SPOM's of the Formula (III) are at least partially, if not completely, soluble in such solvents as: glycerol; paraffin and other mineral oils; multiether compositions such as diglyme (i.e., CH$_3$OCH$_2$CH$_2$OCH$_2$CH$_2$OCH$_3$), triglyme (i.e., CH$_3$OC$_2$H$_4$OC$_2$H$_4$OC$_2$H$_4$OCH$_3$) and so forth and, for that matter, very many of the available ether solvents such as butyl ether (usually the di-n-variety), ethyl-n-butyl ether, di-n-amyl ether, diisoamyl ether, di-n-hexyl ether, ethylene glycol dimethyl ether, di-n-heptyl ether, di-n-decyl ether, etc., including chlorinated and other halogenated derivatives thereof and higher symmetrical and non-symmetrical ethers to the point where their involved viscosities render their use at least awkward if not impossible (taking into account that ethers of the indicated type are immiscible with water); DMF; DMSO; the CELLOSOLVES (Reg. TM) which are monoalkyl ethers obtained by the alcoholysis of ethylene and higher alkene oxides; dioxane and its derivatives, particularly p-dioxane and so forth (all of which named commencing with and including DMF are water-soluble solvents). Further in this connection, most of the known solvents for polyacrylonitrile, especially in its fiber-forming embodiments which includes DMF and DMSO, are appropriate solvent materials for the Formula (III) SPOM's.

In any event and as has been indicated, the incorporation of basic additaments in any dissoluting system for the SPOM does facilitate solubility with practically any given solvent to be involved. This is usually more pronouncedly noticeable when an ionically disassociatable material, such as the alkali metal bicarbonates, are employed for the purpose. The following Equation (5) is elucidative of why this phenomenon occurs, utilizing as the basic material for the illustration sodium bicarbonate:

Equation (5)-HYPOTHESIS FOR SPOM SOLUTE CONCENTRATION INCREASES IN SOLVENTS THEREFOR BY USE OF BASIC ADDITAMENTS

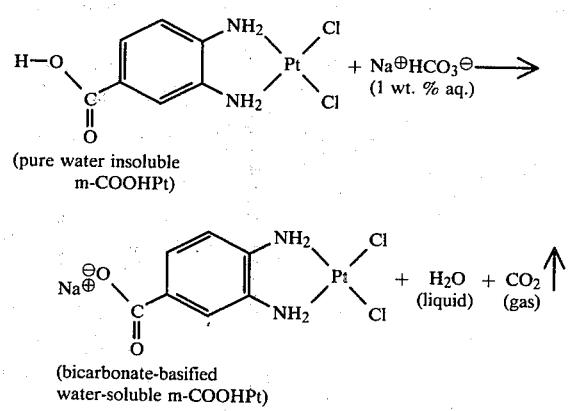

(pure water insoluble m-COOHPt)

(bicarbonate-basified water-soluble m-COOHPt)

In general, the WSP:SPOM complex(es) of the present invention are prepared, most advantageously in the presence of water, by intimately intermixing and combining in one way or another and with all of the materials to be complexed being exposed to one another at the same time or by means of gradual aliquot or incremental intercombination of the respective WSP and SPOM (or desired mixtures of one or another or both of the individual complex-forming components). This is best done by solution procedures using miscible or immiscible solvent systems for the respective WSP(s) and SPOM(s)

to be complexed, including systems in which the WSP solvent is comprised of a portion of the SPOM solvent in instances when the latter is miscible with the former. It can also be accomplished by dispersion procedures, in which either or both of the components are not fully or at all soluble in the solvent(s) utilized but undergo the complex-forming reaction upon making of intimate contact therebetween.

The product WSP:SPOM complexes that are formed can be either completely water-soluble, partially or limitedly soluble in water or water-insoluble materials. For many applications it is desirable for resultant product WSP:SPOM complex(es) to be of a water-soluble nature.

Since the complexing interaction between the WSP and the SPOM is to a greater or lesser extent an equilibrium situation, especially when water is present and a water-soluble WSP is employed (as is the most typical and largely utilized encounterment), systems wherein the formed complex precipitates are advantageous in that they permit more-ready access of uncomplexed ingredients into the zone, interface or other region or space of complex formation to replace the self-removing, precipitating complex product being formed. However, other excellent techniques for complex preparation not dependent on product precipitation are available, as is hereinafter more fully brought forth.

In most cases, the complex-forming reaction can be well conducted at normal ambient or room temperatures, such as those in the 20°-25° C. range. In fact, conduction of the complex manufacture at room temperature is generally preferred. However, sometimes use of higher temperatures, such as those up to 50 or so °C. may be advisable, especially if they tend to influence better dissolution (when solution systems are wanted) of one or the other of the complexing ingredients. It is rare to conduct the complexing at temperatures lower than about 15° C.; although, actually, it can be done without difficulty (excepting as may be relevant to unnecessary temperature control and/or heat provision) at temperatures from as low as those involving the freezing point of the solution(s)-or solvents in dispersed ingredient systems-to as high as those whereat WSP decomposition detrimentations and difficulties may likely be encountered.

Formation of the WSP:SPOM complexes can be nicely accomplished by batch-wise procedures wherein all the interacting ingredients are brought together in a single complex-making vessel or other container therefor. This can also include techniques, quite often adopted, wherein one of the ingredients for the complex-formation is continuously or intermittantly added over a period of time to the entire mass of the other to be utilized or to at least substantial portional bulks thereof. Likewise, continuous processing arrangements can be employed wherein, for example, the separate complex-forming solutions or dispersions of the WSP and SPOM are brought together from two intermixing feed streams for ongoing passage through a suitable unit wherein the complexing occurs. In any event, it is especially advantageous to resort to good agitation and mixing practice for facilitation of the complexing; this being particularly so when batch preparations are being done.

For all practical purposes, the WSP:SPOM complexing reactions or interchanges in the practice of the present invention are effectively instantaneous. For sake of prudence, time periods of short order, say of about 5-10 or 15 minute periods, may be observed in order to ensure maximized complexed product formation. It is rare when any given complexing procedure requires as much as ½ hour for reason of needing that much time to get the thing done.

A most important factor in the complex-forming reactions is the pH of the reaction mass (or at least the zone or contact space-region) wherein the WSP and the SPOM components are brought into intimate, efficiently interdispersed and intermingled, interblended or intermixed contact to permit the formation of the WSP:SPOM complex product(s). For satisfactory results, the involved pH should be more on the acid side in the range between, on an overall basis, about pH 1 and pH 7.5 or even 10 or so. These, as is readily apparent, include compositions whose pH is in the so-called "isotonic" range. Optimum and most productive and efficacious results are generally obtained when the complexing is conducted at a pH of about 4.5; this holding true for practically all the various products obtainable and regardless of particular complexing procedure or technique put into effect. For complexations with phenoxide SPOM's, higher pH's are best used.

To prepare the respective components for complexing, the WSP is most preferably made into an aqueous solution thereof. However, as has been mentioned, it is possible for the WSP solvent to contain some portion of that employed for dissolution of the SPOM in the instances when the latter is a water-miscible material. In such event, it is advisable for the aqueous WSP solvent to contain at least about 50% by volume of water in mixture or liquid solution with the water-miscible SPOM solvent employed. The concentration of the WSP in the water or other aqueous solvent therefor can be from as low as 1 or so to as high as about 60 wt.%, depending to some extent on the complexing technique to be utilized and the temperature (if other than room) employed, as well, of course, on the solubility characteristics of the particular species of WSP being handled. Greater concentrations in the solvent of course minimize fluid bulk handling problems. On the other hand, use of excessively concentrated WSP stock may not permit the complexing to be so thoroughly or effectively achieved due to handling and intercontacting difficulties that may therebecause be encountered. As to the SPOM when made up in solution for the complexing reaction (and it is preferable for optimum results to utilize an SPOM solvent capable of at least partially dissolving the particular involved organometallic or organometallic mixture employed), it is desirable for at least about 5% of the totality of the SPOM material utilized for reaction stock make-up to be dissolved in the solvent utilized therefor.

In a manner of more specific description, a number of the suitable ways in which WSP:SPOM complex formation may be quite satisfactorily achieved are now delineated. These are as follows, wherein, for sake of simplification and convenience, the illustrative WSP in PVO-M and other specific solvents and ingredients are specified, even though the involved principles are generally applicable to literally all WSP:SPOM complexes possible to prepare and provide by literally any or all of the discussed methods in the following and reduction to practice of the invention:

(M1). Dissolve the SPOM and PVO-M in DMF. Pour out the resulting solution in an excess of water. If the complex that is formed is insoluble, it should then precipitate. As PVO-M (like most of the WSP's) is itself water-soluble, analysis of the precipitate provides good indication of actual complex formation and the fact that it has occurred. This, at least for general screening and evaluation purposes, is an especially good procedure to determine if for any given system a water-insoluble SPOM will complex with the intended complectant WSP.

(M2). Dissolve to the greatest possible extent the SPOM in a water-soluble organic solvent such as an alcohol, DMF, acetone, DMSO, etc. Slowly drop into an excessive quantity supply of aqueous PVO-M solution at about a 5 wt.% concentration. The WSP:SPOM complex thereupon formed will precipitate in most instances and sooner or later during the course of PVO-M addition. This procedure is also useful for some preliminary purposes to determine how much quantitatively a given SPOM will tie up the involved PVO-M or vice versa. In the execution of this sort of procedure, the PVO-M excess should be quite large; on the order, for example, of 5 to 10 times stoichiometric requirements.

(M3). When utilizing SPOM's whose sodium (or other alkali metal) salts are water-soluble, there can be mixed together solutions of aqueous PVO-M (adjusted with $NaHCO_3$ or equivalent base to at least very approximately if not exactly pH 7) with an aqueous solution of the water-solubilized SPOM salt. To determine if complexation occurs, observation of precipitate formation should be made; this being done by PVO-M addition of the SPOM salt solution. In this, the precipitate obtained will either be the desired complex or the SPOM salt in uncombined condition. Acidification (ordinarily with HCl) usually accompanies PVO-M addition.

(M4). Dissolve both the PVO-M and the SPOM in a suitable mutual solvent for the organometallic and the aqueous stock of the PVO-M. Pour the mutually-dissolved ingredients in the selected solvent (such as, by way of illustration, DMF, DMSO or p-dioxane) into an excess of benzene; this manipulation being a counterpart, as it were, of the procedure described in Paragraph (M1) above since the SPOM, per se, may be benzene-soluble while PVO-M (like most other WSP's of the Formulae (I) and/or (II) is not. This immediately-described technique is particularly useful for the preparation and handling of SPOM's which hydrolyze or tend to hydrolyze in the presence of water; this by obvious virtue of the absence of water in the procedure. Mineral oil is a good alternative for benzene in the utilization of this technique.

(M5). When the WSP:SPOM complex product is made to result in an aqueous solution, mineral oil addition (in a way obverse of that described in the above Paragraph (M4)) will generally cause product precipitation. Surprisingly, glycerol (a completely water-miscible liquid) also causes precipitation of formed WSP:SPOM complexes. In this connection, whenever the product complex forms and isolates itself as a precipitate, recovery is generally made by filtration which, if desired, can be preceeded by liquid decantation or equivalent liquid removal steps in order to minimize fluid-handling requirements during the filtration should the quantity of total involved liquid be so great as to give rise to any such problem.

(M6). A solubilized SPOM prepared by salt formation thereof is dissolved in water. The PVO-M stock is then added directly in aqueous solution or as a solid charge. It is possible, of course, to reverse the dissolving sequence or to simultaneously dissolve the water-soluble SPOM salt and the PVO-M. The resulting WSP:SPOM complex-containing solution (usually clear) is then simply and in a straight-forward manner dried, as on a drum dryer or by other suitable drying means, to provide the product complex in dry-solid condition.

(M7). When the complexed WSP:SPOM product is made and results as finished material left in the solution, be the same either aqueous or organic, the recovery can be made by simple solvent stripping. Frequently, reduced pressure is materially helpful in such evaporative recovery processes. Naturally, heat at an elevated temperature is requisite to drive off the solvent from the WSP:SPOM complex being so recovered.

(M8). When the SPOM is made up as reactant supply stock in a suspension or other dispersion of some solvent (usually organic although it may also contain some water therein), an aqueous supply stock solution of PVO-M or other WSP is added to the dispersion, whereupon there is formed a precipitate or gel of the complexed WSP:SPOM product. This is then filtered out and dried for product recovery purposes.

Reference is now made to FIG. 2 of the accompanying Drawing. While the therein-shown representation is without the scope or practice of the present invention, the portrayal is very useful to demonstrate the happenings and expectabilities from complexing complectate materials distinct from and fundamentally different than the presently-involved SPOM compounds of Formula (I). Viewed in this light and understanding that the FIG. 1 portrayal has nothing to do with or about the instant WSP:SPOM complexes, useful implications by deductive reasoning analogy can be gained from observation of the FIG. 2 presentation for beneficial application in the manner of "historical learning" to and for the better practice of the present invention.

Accordingly, it is discercernible in FIG. 2 that high aqueous concentrations of K-15 PVP and the same as to the phenol complectate solutions in methanol yield high-viscosity precipitates of complexed product with clear supernatants therein. From this point of commencement, it is plain that addition of increasing volumes of water causes occurrance of "milky" solutions (if that they be) until there is arrival at the point where true solution finally occurs. Similarly, increasing amounts of methanol also produce "cloudy" solutions until, finally, solution occurs. The viscosity of the complex-containing composition decreases with increasing methanol concentration but, peculiar as it may seem, not with increasing concentration of water.

As an aid in practice of the present invention when water-miscible solvents are utilized for dissolution of a given SPOM, phenomena at least roughly analogous to that seen in the FIG. 2 showing can be anticipated with advantage taken thereof in and for the complex-forming, processing and recovery steps and procedures needed to be employed and for which best-possible-means are desirable to utilize and effectuate.

There exist certain applicable principles or generalities relevant to the formation of insoluble WSP:SPOM complexes. These, somewhat in the nature of platitudes, are that insoluble complex formation is:

(P1). Highly dependent on the specific nature and characteristics of the involved SPOM;

(P2). Largely independently of the WSP that is utilized;

(P3). Easier to accomplish with employment of higher molecular weight forms and species (obviously including cross-linked varieties) of the involved WSP;

(P4). Induced and facilitated by the presence of salts in the preparation system which, when present, significantly minimize higher concentration requirements for the SPOM (i.e., allow use of much less concentration of the SPOM in the solvent in which it is utilized than otherwise would be the case without benefit of the salt in the system; and (P5). Tended to be decreased by the addition of organic solvent materials to the system.

These generalities, along with what can be gained from evaluation of the FIG. 2 illustration, are additionally helpful towards the end of securing optimized results in practice of the present invention.

The stoichiometry varies in and is pragmatic significance for the WSP:SPOM complex products in accordance with the present invention. It is possible, for example, to have in the complex one unit of the SPOM that is employed (including those utilized in SPOM mixtures) for each amidocarbonylic unit in the Formula (I) or Formula (II) compound (be it in monomeric or in the more usual polymerized form) that is utilized, including in this mixtures of Formulae (I) and (II) compounds. To illustrate this in simplified manner, it can be supposed that a given PVP being utilized contains 100 repeated units of the polymerized N-vinyl-2-pyrrolidone monomeric moieties therein. Now then, a WSP:SPOM complex product pursuant to the present invention could have 100 SPOM molecules complexed therewith so that each of the repetitive N-vinyl-2-pyrrolidone units in the polymer structure had an individual SPOM unit attached thereto by complex connection. At the other end of the scale, the entire PVP polymer of the 100 repeated-unit structure could have but a single SPOM molecule in complexed relationship therewith. In the first-given instance, the SPOM/WSP ratio in the complexed WSP:SPOM product would be 1:1. In the second instance, this ratio would be 1:100. Both products, by the way, would be useful for various purposes. For example, the 1:1 ratio product might be desirable when relatively large amounts of the SPOM are wanted or needed in the WSP:SPOM complex to be employed. The complex with the 1:100 ratio characteristic might be better suited in utilization where maximized water-solubility of the resultant WSP:SPOM complex is an esteemed desideration. Of course, using the same 100-repetitive-unit PVP, any WSP/SPOM ratio between 1:1 and 100:1 can be achieved, depending on how many SPOM units are put into the complex with the WSP.

For practical purposes and to ensure more thorough and effective complexations, it is usually advantageous for most purposes to keep the WSP/SPOM ratio such that it is considerably more than 1:1. As a rough rule-of-thumb guidline, a ratio in the neighborhood of something resulting from the complexing combination of 2 WSP polymer molecules or units per each SPOM unit employed is satisfactory for most of a wide variety of purposes as well as for providing very good characteristics of the complex product involved. Reverting to the 100-repetitive-unit-containing PVP illustration, this would result in a WSP/SPOM ratio of 200:1. Taking into account that the preponderance of WSP's utilized are polymers with many more than a mere 100 repetitive units therein contained, the more commonly encountered WSP/SPOM ratios, especially when the quantity of introduced SPOM for complexing is at the lower end of the possible complete scale of complexed SPOM content, is frequently in value ranges on the order of substantially more than 200:1; sometimes and not too infrequently being of a 100,100:1 magnitude.

While, as clearly appears from the foregoing, a great variety of various type and style WSP:SPOM complexes can be provided within the scope and purview of the present invention, there are some more particularized embodimental possibilities that enjoy a somewhat prominent desirability for reasons of their properties, generally attractive in broad aspect, and excellent applicability and performance capability for many functions and uses of diversified demand and nature. Three of these possessed of the indicated credentials are set forth in the following Structures (UUU), (VVV) and (WWW):

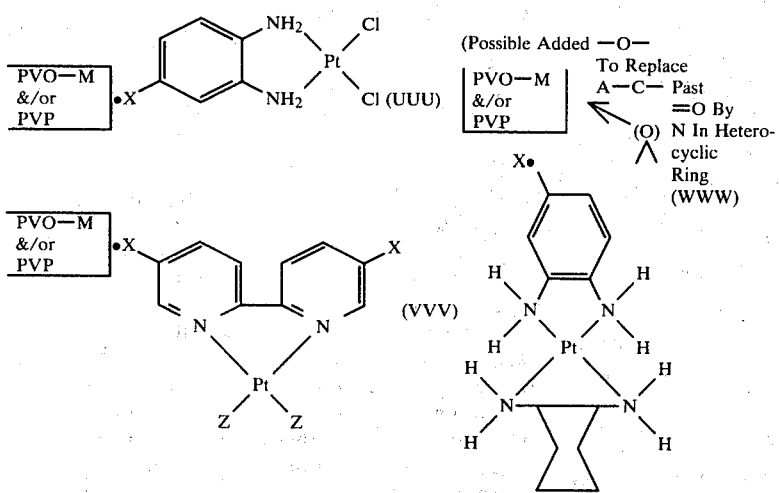

Notes:
• indicates point of hydrogen-bonding or like complexation force.
The so-called "chair" conformation for the cyclohexyl unit in Structure (WWW) is generally more stable than a "boat" configuration.

WORKING EXEMPLIFICATIONS OF THE INVENTION

The following illustrative examples show the fundamentals of and the great benefit to be obtained from reduction to practice of the present invention. Unless otherwise specified in any given instance(s): all percentages are by weight, based on total weight of involved composition; and all temperature readings are in °C.

First Illustration (Preparation Of m-OHPt)

Theoretically, in the following of the above-given Equation (3), one molar quantity of m-OHPt product (M.W. 389.1) should be obtained from the reaction of one mole of 3,4-diaminophenol-dihydrochloride (i.e., "DPhdiCl"-M.W. 197) with one mole of $K_2PtCl_4$ (M.W. 415.1).

Utilizing the Equation (3) procedure without stirring of starting reactant materials, 0.2384 g. of DPhdiCl (0.00121 mole) was dissolved at room temperature (i.e., "RT") in 10.0 ml. of 1 n aq. HCl in a 100-ml. round bottomed glass flask having a long single neck entry thereinto. The flask was wrapped with aluminum foil and placed in a 50° constant temperature water bath wherein it was allowed to equilibrate. To this solution there was added 0.5000 g. (0.00121 mole) of the potassium tetrachloroplatinate reagent. The charge of the $K_2PtCl_4$ was made in a single loading of the involved quantity thereof into the flask through a polyethylene funnel. To rinse the funnel after charging, 5.0 ml. of 1 N HCl was therethrough flushed into the flask. Thereupon, the flask was immediately stoppered and covered with aluminum foil. Although no stirring was utilized during the reaction, the charged flask was, at the outset, given several manual swirls to effect a homogeneous solution of the $K_2PtCl_4$ in the DPhdiCl.

After 60 hours at 50°, the aluminum foil wrapping was removed to terminate its light-excluding effect. This revealed the presence in the flask of a clear supernatant colored in a hue best described as "yellow-green-brown" over clusters of dark, army-green colored crystals. The crystals were collected under reduced pressure; after which they were sequentially washed with successive 25 ml. portions of: first, water; then, acetone; and, finally, anhydrous diethyl ether. The crystals were placed over-night in a vacuum dessicator which was continuously pump-evacuated. A 94% of theoretical yield was realized in the preparation.

Variation Of First Illustration (Preparation Of m-SO₃Pt)

The starting material employed was 3,4-diaminobenzene sulfonic acid as is illustrated in the foregoing Equation (4). Its M.W. is 156 while that of the m-$SO_3Pt$ therefrom derived is 421.2.

A 0.2500 g. (0.0016 mole) quantity of the starting material was dissolved in 10.0 ml. of aq. 1 N HCl using a covered flask arrangement and 50° equilibration as in the First Illustration. Constant agitation effects were implemented and promoted by use of a magnetic stirring bar within the flask and in the hot water bath.

To the clear, light-yellow solution of the starting material in acid there was then added 0.6640 g. (0.0016 mole) of potassium tetrachloroplatinate through a polyethylene charging funnel for the flask. The funnel was thereafter rinsed with two pipettefuls of the aq. 1 N HCl; after which a glass stopper was inserted into the neck top of the flask for sealing and foil wrapping of the flask was done. The preparation was then left to stand in the 50° constant temperature bath with uninterrupted stirring for 60 hours, taking care that no light got into the reaction mass. After this, the aluminum foil was removed to reveal a reddish and cloudy opaque solution in which there was not the slightest discernability of any precipitate present.

In order to determine if any crystallization would take place at reduced temperature conditions, the solution containing flask was refrigerated overnight at about 2°-3°. A noticeable smidgen of very fine purple-white powder was observed at the bottom of the flask; but it was of such diminutive bulk that there was not enough present (so that it could not be) for even Buchner filtration.

In order to recover the m-$SO_3Pt$ product, the then red-orange appearing mixture (following failure of the crystallization attempt) was subjected to evaporative conditions. This was done by putting the flask and generally dissolved contents in a hot water bath maintained at about 42° while putting the enclosed system under reduced pressure (using a vacuum pump for the purpose) of about 55 mm. Hg.

Continuous stirring of the liquid was kept up during the evaporation procedure until a thick yellow mixture resulted.

The intermediate yellow mixture was then put under vacuum in a dessicator over anhydrous calcium chloride for almost 5 days. After that treatment, the material (which had been allowed to stay in the flask throughout the entire exercise) remaining took on a tan appearance but remained, nonetheless, somewhat wet. A streak of pale yellow solid did appear on one of the inner wall surfaces of the flask.

Completion of the recovery was accomplished by putting the solids-containing flask in the vacuum dessicator under less than 5 mm. Hg pressure for an extended period. The finally-treated solid was observed to be good quality, fine purity m-SO$_3$Pt. The sulfonic acid SPOM's are for many utilizations in complex-making according to the invention of considerable desirability due to their water-solubility which greatly facilitates certain WSP:SPOM complex formations.

Second Illustration (Analyses Of Various Platinous SPOM's)

The First Illustration procedure was four-times basically repeated to prepare, respectively: m-Hpt; m-OMePt; m-COOHPt; and o-OHPt. Of course, specifically different o-diaminobenzene starting materials had to be employed to get each different product. Each of the resultant products, along with the m-OHPt of the First Illustration, were then chemically analyzed. TABLE III shows the results obtained in the reporting of these analyses.

TABLE III

| Platinous | ANALYTICAL RESULTS | | | | | |
|---|---|---|---|---|---|---|
| | Actual | | | Calculated | | |
| SPOM | % C | % H | % N | % C | % H | % N |
| m-HPt | 19.53 | 2.08 | 7.45 | 19.26 | 2.16 | 7.49 |
| m-OMePt | 20.99 | 2.62 | 6.94 | 20.80 | 2.49 | 6.93 |
| m-COOHPt | 20.29 | 2.06 | 6.72 | 20.11 | 1.93 | 6.74 |
| m-OHPt | 18.57 | 2.20 | 7.14 | 18.47 | 2.06 | 7.18 |
| o-OHPt | 18.42 | 2.12 | 7.12 | 18.47 | 2.06 | 7.18 |

The Actual Results obtained were so exceedingly close in all instances as to be, for practical purposes (and allowing for reasonable experimental error), "literally the same" as the Calculated Results. Needless to mention, this demonstrates the exceeding fineness and excellent quality of the obtained SPOM's. As has heretofore been mentioned, the old m-HPt and the novel m-OMePt are not adapted for use nor applicable in practice of the present invention. Their inclusion in this Second Illustration, as was the case for their illustration in FIG. 1 of the Drawing, is for comparative purposes with the SPOM's suited for utilization in preparation of the WSP:SPOM complexes of instant concern.

Third Illustration (Preparation Of PVO-M:m-COOHNaPt Complex Per Method (M3))

The experiment was conducted on a small scale using a standard one-dram vial for the performance of same. As is well known to those skilled in the art, a one-dram vial has a 4 ml. fluid capacity within its hollow glass body that has a diameter of 1 cm. and a length of 5 cm. The vial is provided with graduated markings on its surface spaced at ⅛ inch intervals along the 5-cm. length or height of the vial. Each ⅛ inch interval of the vial's height (when it is in upright disposition) indicates and measures a 0.3 ml. volume quantity of liquid within the interval.

One vial was filled to the ⅝ inch level with water, after which there was therein dissolved 0.06 gm. of K-30 PVO-M.

Another vial was charged with 0.04 gm. of m-COOHPt and then filled to the ¼ inch level with water. Solid NaHCO$_3$ was added in minute incremental portions to the m-COOHPt-containing vial with efficient Vortex-mixing between each addition. Gas evolution was noted with each of the bicarbonate inclusions. This was continued until a clear, dark blue solution was obtained. After this had happened, the solution was permitted to stand still for several minutes, whereupon the solution color changed to clear dark green.

All of the aqueous PVO-M solution from the first vial was added dropwise to the m-COOHNaPT solution in the second vial but no precipitation was observed and the solution retained its dark green coloration. Sixteen (16) drops of aq. 1 N HCl were then slowly added to the second vial. After 10 drops of the acid had been put in, a clinging green material was noted floating on the surface of the liquid which quickly redissolved upon Vortex-mixing. When all 16 drops of the acid were included, a highly viscous gel formed; but no particle deposition could be observed at the bottom of the vial. The vial was allowed to stand for about ½ hour at the end of which time the gel became "soupy" and appeared as an opaque, olive-green mixture. Eight (8) more drops of the aq. 1 N HCl were subsequently added but this caused no further gas evolution not did it cause any reappearance of the viscous gel formation. This indicated the successful PVO-M:m-COONHaPt complex production.

Fourth Illustration (Preparation Of PVO-M:m-COOHPt Complex Per Method (M4))

Using a one-dram vial, 0.06 g. of K-30 PVO-M were dissolved in ½ inch of DMF in the vial with Vortex-mixing thereof supplemented by stirring agitation with a wooden stick. There was then added to the solution of PVO-M in DMF 0.02 g. of m-COOHPt. Upon addition thereof, complete solution occurred. The resulting mixed PVO-M/m-COOHPt solution in DMF had a clear blue color. This mixed solution was then poured into about 20 ml. of benzene. Upon swirling of the vial, a flaky, clumpy, gray-blue precipitate formed which settled out on the bottom of the vial. A few particles of the flaky precipitate were removed from the vial. They were put into a few drops of distilled water in another vial and were quickly completely dissolved therein. The flakes were of uniform and continuous coloration throughout.

The precipitate from the first vial was recovered by filtration then air dried. A hard, crumbly, gray-blue solid was thereupon obtained as product. The product was subjected to an infra-red spectrum analysis which verified (by appropriate band(s) indications) the successful formation of the PVO-M:m-COOHPt complex.

Fifth Illustration (Preparation Of PVO-M:m-COOHPt Complex Per Method (M8))

A quantity of 0.0250 g. ($6.0 \times 10^{-5}$ mole) of m-COOHPt was placed in a $1 \times 7$ cm. test tube. An amount of 0.67 ml. of 1% aqueous PVO-M of K-30 value (6.0×10$^{-5}$ mole) was then added to the tube. The mixture was first manually swirled; then subjected to Vortex-mixing. Only partial solution was thereby caused.

An additional 0.68 ml. of the PVO-M solution was then added with additional vigorous shaking. Solution still did not come about. Upon standing, a finely-divided powder settled out on the bottom of the test tube.

An identical quantity to that first employed of the m-COOHPt was put into another test tube to which were added 20 drops of glycerol and thereafter subjected to Vortex-mixing until a dark green suspension was formed. Some solution appeared to have taken place; but many undissolved m-COOHPt particles remained in visible suspension. Another 0.67 ml. amount of the PVO-M solution in water was added and the mixture again shaken. Only partial solution of the m-COOHPt occured. Then, an additional 0.67 ml. of the PVO-M solution was put into the second test tube. After this, almost all of the m-COOHPt appeared to dissolve but a few suspended particles still remained. At the same time, a puffy flocculant was observed to form. Upon standing, the flocculant became even more puffy and very slowly settled from the suspension.

In both instances, the PVO-M:m-COOHPt complex was formed.

Repeated Demonstration of Fifth Illustration
(Replication Of Third, Fourth And Fifth Illustrations
With PVP And Other Platinous SPOM's)

The Third through Fifth Illustrations are identically repeated excepting to replace the PVO-M with a PVP of about K-30 and the m-COOHPt's with, in sequence, m-SO$_3$HPt; m-OHPt and o-OHPt. About identical good results are obtained to produce the specifically different complex products then resulting, namely, those of: PVP:m-SO$_3$HPt; PVP:m-OHPt; and PVP:o-OHPt.

Sixth Illustration (Bacteriological Action Of Complexes
Of PVO-M:m-COOHPt; PVO-M:m-OHPt; and
PVO-M:o-OHPt)

Using pure complexes identified in the Heading of this Illustration, 0.0003 g. samples of each were (separately) finely ground to pronounced pulverulent condition employing an agate mortar and pestle for the particle size reduction.

Each of the polverized samples were then added to separate 100 ml. portions of hot, semi-solid agar. After this, they were each very thoroughly mixed and the resulting fine suspensions were then poured into bacterial culture growth plates. To each of these was then added 1 drop of E. Coli B culture broth from a dropping pipette. The cultured specimens were then incubated for 12 hours at 37°. All of the plates then had a somewhat cloudy appearance indicative of some growth; but much less than that which occurred in the untreated reference plate cultured and incubated in the same way.

Three (3) more separate samples of the same pulverized complexes were then sprinkled in individual 0.0003 gm. quantities over the surfaces of solid agar plates which had previously been cultured with E. Coli B by surface-streaking, then incubated as above. After incubation, each of the samples were prepared into specimens for scanning electron microscope inspections. This was done by first inverting the cultured and grown plates over formaldehyde fumes for fixation purposes. Then, small colonies of bacterial growth were scraped off the plate surfaces and mounted on stubs which were gold coated for 2 minutes. Pictures of each specimen were then taken.

Each of the obtained photographic results showed positive evidence of considerable bacterial filamentation and elongation. This demonstrated the bacterial growth regulation effectiveness as static agents of each of the complexes tested, since the filamentous growth effect is convincingly demonstrative of the capability of the agent to stop actual bacterial multiplication and force the bacteria into deleterious elongating (and weakened vitality and potential) development.

Seventh Illustration (Use Of PVP:m-COOHPt
Complex As A Catalyst For Hydrogenation)

A hydrogenation shaking apparatus is employed similar to that particularized and explained at pg. 65 of *Organic Chemistry* by L. Fieser and M. Fieser (1944 Ed.) published by D. C. HEATH AND COMPANY of Boston.

Into the apparatus is charged 100 parts by weight of cyclohexene and 3 parts by weight of the PVP:m-COOHPt complex prepared with a 2:1 WSP/SPOM ratio. Hydrogen is admitted at a pressure slightly in excess of atmospheric and the reaction conducted at 90°. Excellent conversions of the cyclohexene to cyclohexane are obtained.

The equivalent good results are obtained when the foregoing is repeated excepting to substitute for the PVP:m-COOHPt complex 6 parts by weight of an analogous PVP:m-COOHPD complex in an analogous 2:1 WSP/SPOM ratio; the SPOM made with PD(II) as for Pt.

Eighth Illustration (Hydrogenation Of Cottonseed Oil
Using A PVP:m-OHNi Complex As The Catalyst)

A 2:1 WSP/SPOM ratio complex is made of PVP of K-30 value and a m-OHNi made so as to be equivalent in structure to m-OHPt excepting, instead of Pt(II) to include Ni(II) in the structure.

Using the same apparatus and procedure as in the Seventh Illustration excepting to operate at 180°, there is charged for hydrogenation 100 parts by weight of cottonseed oil and 12 parts by weight of the PVP:m-OHNi complex. The hydrogenation is conducted with the gas under about 20 pounds per square inch (guage) pressure and continued until an iodine number of about 65 is attained in the hydrogenated product. A very good, hardened cottonseed oil manufacture is realized.

Analogous good results are obtained when the foregoing is repeated excepting to employ other of the metals M for the SPOM production and to vary the A, Z, X, Y and G constituents therein as well as to employ such diverse complexes with other WSP's of the Formulae (I) and/or (II) including, in particular (but without any restriction or limitation thereto) poly(2-ethyloxazoline) materials therefor.

Amongst many possibilities as will appear and be readily visualizable by those skilled in the art, the WSP:SPOM complex products of the present invention may also be utilized:

(U1). As electroplating agents especially when they are of a water-soluble nature and very thin (sometimes preliminary) coatings of expensive metals are desired to be applied in the plating operation.

(U2). Especially when the SPOM's are made with Pt(II), Pd(II), Ir(I) and/or Au(III), as electrochemical catalysts, particularly when the complexes are of a water-soluble nature and oxidation/reduction operations of the type utilized in chlor-alkali manufacture in which porous, sintered metal electrodes are employed which usually need catalyzation which can be provided by saturating the very porulous electrodes with an appropriate complex then reducing the latter within the electrode so as, in a very expeditious manner, to provide the inner pore surfaces of the electrode with needed electrocatalytic material.

(U3). To make coating solutions for application to plastic and other film and membrane surfaces required to be rendered electroconductive as for use in capacitor manufacture and other purposes and applications where such materials are required.

(U3). As catalytic agents above and beyond the above-demonstrated hydrogenation purposes and the above-indicated electrocatalytic applications in and for reactions where any or all of the metals M (or their mixtures) are effective for improvement in (or inducement of) reaction promotion).

(U4). As chemical intermediates for a wide variety of conceivable transformations, fabrications and syntheses.

(U5). In a wide variety of bioscientific applications (i.e., those relating to or connected with life, vital phenomena and/or living organisms) including those having biological and physiological implications and values such as in and for pharmaceuticals and therapeutic agents as well as in and for fungicides, insecticides, herbicides, germicides, nematocides and so on and so forth wherein good performance(s) and benefit(s) for any one or another given purpose or desired end may be obtainable with and from use of the presently-contemplated WSP:SPOM complex product(s) by virtue of the presence therein of any or all of the metallic constituents M as well as and often even more so on the strength of the presence therein, with or without meaningfulness as to the metallic constituent, of any one or more of the entities, substituents or constituents A and/or Z and/or X and/or G and/or Y with possible synergystic effectiveness realizable from any given plural combinations of M, A, Z, X, G, and/or Y insofar as concerns the generality and totality of said possible bioscientific potentials and utilizations.

Many changes and modifications can readily be made in and adapted to embodiments and practices in accordance with the present invention without substantial departation from its apparent and intended spirit and scope, all in pursuance therewith and accordance as to the same as it is set forth and delineated in the hereto-appended Claims.

APPENDIX

LISTING OF REFERENCES:

Ref. No. Identification (1) In an Article by I. M. Klotz and J. M. Urquhart entitled THE BINDING OR ORGANIC IONS BY PROTEINS - COMPARISON OF NATIVE AND MODIFIED PROTEINS appearing in "Journal of the American Chemical Society" (i.e., "JACS"), 71, 1597 (1949);

(2) In an Article by F. Karush and M. Sonneberg entitled INTERACTION OF HOMOLOGOUS ALKYL-SULFATES WITH BOVINE SERUM ALBUMIN appearing in JACS, 71, 1369 (1949);

(3) POSSIBLE COMPLEX FORMATION BETWEEN MACROMOLECULES AND CERTAIN PHARMACEUTICALS X by D. Guttman and T. Higuchi, "Journal of the American Pharmaceutical Association" (Scientific Edition) - i.e., "JAPA" - Vol. XLV, No. 10 - Consecutive No. 20, pp 659-664 (October 1956);

(4) STUDY OF POSSIBLE COMPLEX FORMATION BETWEEN MACROMOLECULES AND CERTAIN PHARMACEUTICALS by T. Higuchi and R. Kuramoto, JAPA, Vol. XLIII, No. 7, pp 398-401 (July 1954);

(5) POLYVINYLPYRROLIDONE (PVP) - A USEFUL ADJUNCT IN COSMETICS by H. A. Shelanski, M. V. Shelanski and A. Cantor, "Society of Cosmetic Chemists (London) Journal", pp 129-132 (1954);

(6) U. S. Letters Pat. No. (i.e., "U.S.") 2,948,708 by W. E. Walles and W. F. Tousignant;

(7) THE INTERACTION OF PVP WITH AROMATIC COMPOUNDS IN AQUEOUS SOLUTION by P. Molyneux and H. P. Frank, JACS, Vol. 83, No. 15 (August 15, 1961);

(8) U.S. Pat. No. 3,133,904 by W. F. Tousignant and W. E. Walles;

(9) U.S. Pat. No. 3,245,951 by W. E. Walles;

(10) U.S. Pat. No. 3,248,399 by W. E. Walles and S. S. Leff;

(11) PVP, AN ANNOTATED BIBLIOGRAPHY (1951-1966) by GAF CORP., 141 West 51st Street, New York, New York 10020, Vol I, pp 1-53 (1967);

(12) PVP, AN ANNOTATED BIBLIOGRAPHY On "Food, Drug and "Cosmetic Uses" by GAF CORP. Vol. II (1967);

(13) ADSORPTION OF NATURAL PHENOLS FROM BEER AND WINE by V. L. Singleton, "Technical Quarterly of the Master Brewers Association of America", Vol. 4, No. 4, pp 245-253 (1967);

(14) U.S. Pat. No. 3,365,426 by W. E. Walles;

(15) U.S. Pat. No. 3,449,339 by W. E. Walles;

(16) U.S. Pat. No. 3,492,223 by W. E. Walles;

(17) "Encyclopedia Of Chemical Technology" by JOHN WILEY & SONS of New York City, Vol. 21, 2nd Ed., pp 427-440 (1970);

(18) U.S. Pat. No. 3,539,540 by W. E. Walles, W. F. Tousignant and T. Houtman, Jr.;

(19) U.S. Pat. No. 3,579,515 by W. E. Walles;

(20) U.S. Pat. No. 3,597,395 by W. E. Walles;

(21) U.S. Pat. No. 3,597,500 by W. E. Walles;

(22) THE USE OF POLYVINYLPYRROLIDONE IN BREWING by R. V Dahlstrom amd M. R. Slat, "Brewer's Digest" Vol. 47, pp 75-80 (1972);

(23) PLATINUM COMPLEXES WITH ANTI-TUMOR ACTIVITY by T. A. Conners, "Chemical-Biological Interactions", Vol. 5, pp 415-424 especially at pg 418 (1972);

(24) U.S. Pat. No. 3,642,704 by W. E. Walles;

(25) COORDINATION COMPLEXES OF PLATINUM AS ANTI-TUMOR AGENTS by R. J. Speer, H. Ridgeway, L. M. Hall, D. P. Stewart, K. E. Howe, D. Z. Lieberman, A. D. Newman and J. M. Hill, "Cancer Chemotherapy Reports", Pt. 1, Vol. 59, No. 7, pp 629-640 (May/June 1975);

(26) SEPARATION AND/OR CONCENTRATION OF PHENOLIC MATERIALS FROM DILUTE AQUEOUS SOLUTIONS by A. Carpenter, S. Siggia and S. Carter, "Analytical Chemistry", Vol. 48, No. 1, pp 225-228 (January 1978);

(27) PVP - PHYSICAL, CHEMICAL, PHYSIOLOGICAL AND FUNCTIONAL PROPERTIES, Technical Bulletin No. 9642-070 from GAF CORP.;

(28) POLY(2-ETHYL-OXAZOLINE) CHEMISTRY AND APPLICATIONS by S. P. Ginter and J. D. Huffines, an unnumbered and undated Technical Brochure available from THE DOW CHEMICAL COMPANY of Midland, Michigan 48640;

(29) PREPARATION AND ANTI-TUMOR EVALUATION OF WATER-SOLUBLE DERIVATIVES OF

APPENDIX-continued
LISTING OF REFERENCES:

| Ref. No. | Identification |
|---|---|
| | DICHLORO(1,2-DIAMINO-CYCLOHEXANE)Pt(II) by P. Schwartz, S. J. Meischen, G. R. Gale, L. M. Atkins, A. B. Smith and E. M. Walker, Jr., "Cancer Treatment Reports", Vol. 61, No. 8, pp 1519-1525 (November 1977); |
| (30) | U.S. Pat. No. 4,137,248 (reported at CA90:197860t) by C. R. Gale and P. Schwartz (and directed to 4-CARBOXYTHALATO(1,2-DIAMINO-CYCLOHEXANE)Pt(II) AND ALKALI METAL SALTS); and |
| (31) | All other Citations, References and Bibliographical Listings besides the foregoing included in any or all of the above Refs. Nos. 1-30 which are different from and additional thereto. |

What is claimed is:

1. A complexed chemical composition comprising, in effectively bonded association:
   a normally water-soluble polymerizable compound having amidocarbonylic units in its structure and polyerizates of same and other amidocarbonylic polymerizates from nitrogenous precursors therefor (i.e., "WSP") as the complectant in and for the complex; and
   a square planar platinous and equivalent metalled organometallic compound (i.e., "SPOM") as the complectate in and for the complex;
   said WSP being a member of the polymer-providing materials and polymerizates selected from the Group consisting of: monomers and polymers and mixtures thereof of the hereinafter-defined Formula (I); and polymers and mixtures thereof of the hereinafter-defined Formula (II); and any of their possible mixtures;
   said SPOM being an organometallic compound of the hereinafter-defined Formula (III);
   the general arrangement of Formula (I) being:

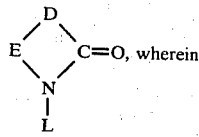
(I)

"D" is selected from the Group consisting of: oxygen; amino, methylene; alkyl-substituted methylenes of the structure "CHR—" in which R contains from 1 to about 3 carbon atoms; methylene carbonyl; ethylene carbonyl; and amido anhydride;
"E" is a divalent link of 2 to 3 carbon atoms having the structure "—(CHR')$_x$" in which x is an integer of value 2 to 3 and R' is hydrogen with the exception that in any single given instance R' can be selected from the Group consisting of: hydroxyl; alkyl radicals containing from 1 to about 3 carbon atoms; haloalkyl radicals containing from 1 to about 30 carbon atoms; phenylalkyl radicals in which the alkyl unit contains from 1 to about 30 carbon atoms; halophenylalkyl radicals in which the alkyl unit contains from 1 to about 30 carbon atoms; cycloalkyl radicals containing from about 5 to about 6 carbon atoms; alkyl-substituted about 5 to about 6 carbon atom-containing cycloalkyl radicals in which the alkyl unit contains from 1 to about 30 carbon atoms; halogenated alkyl-substituted about 5 to about 6 carbon atom-containing cycloalkyl radicals in which the alkyl unit contains from 1 to about 30 carbon atoms; phenyl radicals; alkyl-substituted phenyl radicals in which the alkyl unit contains from 1 to about 30 carbon atoms; halophenyl radicals; alpha-naphthyl radicals; alkyl-substituted alpha-naphthyl radicals in which the alkyl unit contains from 1 to about 30 carbon atoms; halogenated alpha-naphthyl radicals; halogenated alkyl-substituted alpha-naphthyl radicals in which the alkyl unit contains from 1 to about 30 carbon atoms and halogen attachment to the extent present is randomly positioned throughout the radical structure; beta-naphthyl radicals; alkyl-substituted beta-naphthyl radicals in which the alkyl unit contains from about 1 to about 30 carbon atoms; halogenated beta-naphthyl radicals; halogenated alkyl-substituted beta naphthyl radicals in which the alkyl unit contains from 1 to about 30 carbon atoms and halogen attachment to the extent present is randomly positioned throughout the radical structure; haloalkyl-substituted phenyl radicals in which the alkyl unit contains from 1 to about 30 carbon atoms; and halogenated alkyl-substituted phenyl radicals in which the alkyl unit contains from 1 to about 30 carbon atoms and halogen attachment to the extent present is randomly positioned throughout the radical structure; and
"L" is selected from the Group consisting of: vinyl; allyl; and isopropenyl;
the general arrangement of Formula (II) being:

(II)

"Q" is an alkylene radical selected from the Group consisting of those of the structures "$-(CH_2)_{1-4}-$"; and "$-(R_s-CH)_{1-2}-$" in which $R_s$ is a lower alkyl radical containing from 1 to about 6 carbon atoms; and
"R''''" is a radical containing in total from 1 to about 10 carbon atoms and is selected from the Group of those having said quantitative carbon-atom-limitations consisting of: alkyl radicals; alkyl-substituted alkyl radicals; haloalkyl radicals; halogenated alkyl-substituted radicals in which the halogen attachment to the extent present is randomly positioned throughout the radical structure; alkyl-substituted cycloalkyl radicals; halogenated alkyl-substituted cycloalkyl radicals in which the halogen attachment to the extend present is randomly positioned throughout the radical structure; and amino-alkyl radicals; with
"n" being an integer of from 2 to about 5,000;
the general arrangement of Formula (III) being:

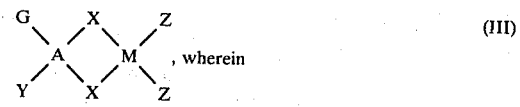
(III)

"M" is a purposively oxidation-numbered, combined, metaliferous constituent capable of accepting 8 orbital electrons from ligands at the interconnecting level of the metallic atoms selected from the Group consisting of: Pt(II); Pd(II); Ni(II); Rh(I); Ir(I); Au(III) and Cu(II), each of which is capable of making tetraligandal attachments;

each "Z" is a ligand that as a radical is monovalent when individually taken and divalent when taken as a single, paired cluster of both of the Z's in coalescence and which can be independently chosen when monovalent and is selected from the Group consisting of: chloro; bromo; fluoro; iodo; ammonia; nitrate, divalent 1,2-diaminocyclohexane; cyclopropylamine; cyclobutylamine; cyclopentyl amine; cyclohexyl amine; ethylene imine; propylene imine; butylene imine; substituted amines of the structure "—$NR_sH_2$" in which $R_s$ is a lower alkyl radical containing from 1 to about 6 carbon atoms; monovalent and divalent ethylene diamine; substituted carboxylates of the structure "—O—CO—$R_a$" in which $R_a$ is a radical containing in total from 1 to not more than about 10 carbon atoms and in its characterizability is any one of those that are alkyl, cycloalkyl, cycloalkyl-substituted alkyl and aryl-substituted alkyl; divalent dibasic acids of the structure "—O—CO—$(CH_2)_{0-3}$—CO—O—"; univalent half-acid dibasic acids of the structure "—O—CO—$(CH_2)_{0-3}$—CO—OJ" in which J is any one of the alkali metals and ammonium; divalent 1,2-cycloalkane dicarboxylates of the structure "—O—CO—CyAlk—CO—O" in which CyAlk in its characterizability is any one of those containing in total from 3 to about 10 carbon atoms exclusive of the carboxylate carbons that are cycloalkane, halocycloalkane, alkyl-substituted cycloalkane, cycloalkyl-substituted cycloalkane and aryl-substituted cycloalkane;

divalent 1,2-aryl dicarboxylates of the structure "—O—CO—Ar—CO—O—" in which Ar in its characterizability is any one of those containing in total from 6 to about 12 carbon atoms exclusive of the carboxylate carbons that are aryl, haloaryl, alkyl-substituted aryl, cycloalkyl-substituted aryl, aryl-substituted aryl, halogenated alkyl-substituted aryl, halogenated cycloalkyl-substituted aryl and halogenated aryl-substituted aryl; monovalent glycerates of the structure "—O—CO—CHOH—$CH_2OH$"; any of the members of the below-defined Group for the substituent Y; any of the members of the below-defined Group for the entity A when that entity is in bidentate ligandal attachment to M and accordingly in effect constituting a divalent paired cluster of both Z's including clustered Z's independently integral and linking said entity A to M, clustered Z's connected with at least a single substituent grouping on said entity A and clustered Z's founded as constitutional and integral component atoms in said entity A; and any of the members of the below-defined Group for the substituent G depending from said entity A;

"A" is an entity that in its characterizability is any one of those that are aromatic and heterocyclic and which is in bidentate ligandal connection with both members of the below-defined Group for the divalent, linking X units including independently integral X's connected with and accepting said entity A, independently integral X's interlinkingly connected with at least a single substituent grouping on said entity A and X's founded as constitutional and integral component atoms in said entity A and which entity A is selected from the Group consisting of: an X-connected substituted benzene that has 0-3 G substituents and 1-4 Y substituents therefrom depending; an X-connected substituted naphthalene that has 0-5 G substitutents and 1-6 Y substitutents therefrom depending; an X-connected substituted bipyridyl that has 0-5 G substituents and 1-6 Y substituents therefrom depending; an X-connected substituted 1,8-naphthpyridine that has 0-5 G substituents and 1-6 Y substituents therefrom depending; an X-connected 1,9-anthracene that has 0-7 G substituents and 1-8 Y substituents therefrom depending; an X-connected 4,5-phenanthrene that has 0-7 G substituents and 1-8 Y substituents therefrom depending; an X-connected 1,2-fluorene that has 0-5 G substituents and 1-6 Y substituents therefrom depending; and an X-connected 4,5-phenanthroline that has 0-7 substituents and 1-8 Y substituents therefrom depending;

"Y" is at least a single substituent depending from said entity A that is selected and done independently so when in plurality from the Group consisting of: hydroxyl radicals; sulfhydryl radicals; sulfonic acid radicals; nitro radicals; carboxylate radicals; omega carboxylic acid ether radicals of the structure "O—$O(CH_2)_{1-6}$CO—OH"; chloro omega carboxylic acid ether radicals; bromo omega, carboxylic acid ether radicals; sulfonyl radicals; imino radicals; thiosulfonic acid radicals following the general typical structure "—O—OS—S—OH"; substituted ureido radicals of the structure

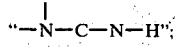

ureylene radicals of the structure "—$NR_s$—CO—N—H"; in which $R_s$ is a lower alkyl unit containing from 1 to about 6 carbon atoms; amido radicals of the structure "—CO—$NH_2$"; alkali metal salts of any of said above-described Y radicals; and ammonium salts of any of said above-described Y radicals;

each "X" is an at least equivalently if not actually divalent in function linking unit depending on residual protonation therein and thereof which makes paired connection between "M" and the entity "A" and each of which X units can be identical or independently different excepting when both X's are the N's in said above-identified heterocyclic entities for "A", which X units are selected from the Group consisting of: bivalent oxygen (i.e., "—O—"); bivalent sulfur (i.e., "—S—"); bivalent amine (i.e., "—$NH_2$—"); bivalent sulfoxyl units (i.e., "—$SO_3$—"); bivalent carboxyl units (i.e., "—COO—"); effectively bivalent 1-6 methylene group(s)-containing omega carboxylic acid ether units and chloro- and bromo- substituted derivatives thereof; effectively bivalent derivatives of mercapto carbonyl units (i.e., "—CO—S—"); effectively bivalent derivatives of hydroxy(thiocarbonyl) units (i.e., "—CS—O—"); effectively bivalent 0-6 methylene group(s)-containing omega mercapto(thiocarbonyl) ether units and chloro- and bromo- derivatives thereof; effectively divalent sulfonyl units (i.e., "—$SO_2$—"); effectively divalent imino units (i.e., "—N—");

effectively divalent thiosulfonic acid units of representative structure "—O—SSO—O"; effectively divalent substituted ureido units (i.e., "—N—C—N—");

effectively divalent ureylene units (i.e., "—NH—CO—N—");

effectively divalent substituted ureylene units of the structure

"—NR$_s$—CO—N—"

in which R$_s$ is a lower alkyl substituent containing from 1 to about 6 carbon atoms; plus effectively divalent amido units (i.e., "—CO—NH$_2$—"); and "G" is an optional substituent of any desired polarity which when present is at least singular in number of depending units in attachment with said entity A that is chosen independently when present in any allowable plurality and is selected from the Group consisting of: hydrogen; any of the monovalent members of the above-defined Group for the ligandal substituent Z; any of the members when provided so as to be in monovalent form of the above-defined Group Y substituent for said entity A; and with the exception of already-here-included hydroxyl radicals any of the members of the Group R' substituents which may depend from said unit E in the structure of the above-given Formula (I).

2. The composition of claim 1, wherein said WSP complectant and said SPOM complectate are effectively bonded in association by electrostatic interaction therebetween that is similative of hydrogen bonding.

3. The composition of claim 1, wherein said WSP complectant and said SPOM complectate are effectively bonded in association by hydrogen bonding effects therebetween.

4. The composition of claim 1 when the WSP of the Formula (I) is a polymer.

5. The composition of claim 1, when said WSP is a polymer containing polymerized in its polymeric structure at least about 50 percent by weight (i.e., wt.%), based on the total weight of involved WSP, of repetitive units constituting said polymer that are comprised of characteristic amidocarbonylic units associated with each of said repetitive units; any balance of polymerizate in said polymer comprising one or more other monomers that are diverse from the monomeric precursors of said WSP and which are copolymerizable with monomeric N-vinyl-2-pyrrolidone.

6. A copolymer in accordance with that of claim 5, wherein said WSP contains at least about 80 wt.% of the amidocarbonylic unit-containing repetitive units.

7. A homopolymeric WSP as the complectant in the composition of claim 1.

8. A water-soluble homopolymeric WSP as the complectant in the composition of claim 1.

9. A composition in accordance with any one or all of the compositions of claim 1, inclusive, wherein the K-value according to Fikentscher of said WSP is between about 2 and about 200.

10. A K-value for said WSP between about 15 and about 90 in the composition of claim 9.

11. WSP having about K-value 30 in the composition of claim 10.

12. The composition of claim 9, when the WSP is comprised substantially of poly-N-vinyl-oxazolidinone (i.e., "PVP").

13. The composition of claim 9, when the WSP is PVP.

14. The composition of claim 9, when the WSP is comprised substantially of poly-N-vinyl-2-methyl-oxazolidinone (i.e., "PVO—").

15. The composition of claim 9, when the WSP is PVO—M.

16. The composition of claim 9, when the WSP is comprised substantially of poly(2-ethyl-oxazoline) (i.e., "POE").

17. The composition of claim 9, when the WSP is POE.

18. A composition in accordance with the composition of claim 1, wherein the ratio in moles of respective complectant WSP and complectate SPOM in said complex (i.e., the "WSP/SPOM" ratio) is at least about 1:1.

19. A WSP/SPOM ratio of about 2:1 in the composition of claim 18.

20. A WSP/SPOM ratio that is substantially in excess of 2:1 in the composition of claim 18.

21. The composition of claim 1, wherein M in said Formula (III) is Pt(II).

22. The composition of claim 1, wherein M in said Formula (III) is Ni(II).

23. The composition of claim 1, wherein said entity A in said formula (III) is a substituted 1,8-naphthypyridine.

24. The composition of claim 1, wherein said entity A in said Formula (III) is a substituted benzene.

25. A composition in accordance with the composition of claim 24, wherein said substituted benzene is a substituted phenolic derivative.

26. A composition in accordance with the composition of claim 24, wherein said substituted benzene is a substituted benzoic acid derivative.

27. A composition in accordance with the composition of claim 24, wherein said substituted benzene is a substituted benzene sulfonic acid derivative.

28. The composition of claim 1, wherein Z in said Formula (III) is chloro.

29. The composition of claim 1, wherein both of the Z's in said Formula (III) are coalesced into and with a bidentate, diligandal, bivalent radical in intimate associated chemical connection thereby with the M in said Formula (III) structure.

30. A composition in accordance with the composition of claim 29, wherein the bidentate, diligandal, bivalent radical is a 1,8-naphthypyridine.

31. The composition of claim 1, wherein X in said Formula (III) is a bivalent amine.

32. The composition of claim 1, wherein X in said Formula (III) is a bivalent carboxy derivative.

33. The composition of claim 1, wherein G in said Formula (III) is any of the monovalent members of the said Z Group substituents.

34. The composition of claim 1, wherein G in said Formula (III) is an alkyl radical containing from 1 to about 30 carbon atoms.

35. The composition of claim 1, wherein G in said Formula (III) is an aryl radical containing from 6 to about 12 carbon atoms.

36. The composition of claim 1, wherein said entity A is a substituted bipyridyl.

37. A composition in accordance with the composition of claim 29, wherein the bidentate, dilangandal, bivalent radical is bipyridyl.

38. The composition of claim 1 as a product in solution in a solvent liquid therefor.

39. The composition of claim 1 as a product in disperson in a dispersant liquid therefor.

40. Either of the compositions of claims 38 or 39 having a pH in the normal isotonic pH range.

41. The composition of claim 1 as a normally solid product.

42. As a composition of matter, a chemical complex comprising:
   (a) a water soluble compound corresponding to the formula:

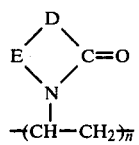
—(CH—CH$_2$)$_{\overline{n}}$ where D is methylene, E is ethylene and n is an integer ranging from about 2 to about 5,000, and (b) a square-planar platinous organometallic compound corresponding to the formula:

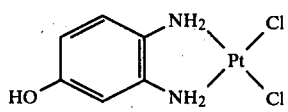

43. As a composition of matter, a chemical complex, comprising:
   a. a water-soluble compound having at least one amidocarbonylic unit in its structure and corresponding to either of the formulas:

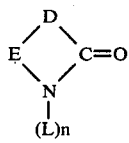
(L)$_n$ (I)

wherein C is carbon, N is nitrogen, O is oxygen, D is a divalent unit selected from the group consisting of oxygen, amino, linear alkylene having from 1 to 4 carbon atoms in the alkylene portion, methylene carbonyl, ethylene carbonyl and amido anhydride; E is an organic unit which introduces from 2 to 3 carbon atoms into the heterocyclic ring; L is selected from the group consisting of vinyl, allyl or isopropenyl, n is an enteger ranging from one to about 5,000;

or

(II)

wherein Q is either a linear or branched alkylene group of the formula

 1 to 4 wherein R$_S$ is either hydrogen, or lower alkyl having from 1 to 7 carbon atoms in the alkyl portion; R is either alkyl, haloalkyl, or aminoalkyl having from about 1 to 10 carbon atoms in the alkyl portion, and Y is an enteger from about 2 to about 5,000;

or

(III)

where X is either alkyl, hydroxyalkyl, carboxyalkyl or aminoalkyl having from 1 to about 20 carbon atoms in the alkyl portion, or aryl, heteroaryl or substituted aryl; Y is either hydrogen or any X; n is an integer ranging from one to about 5,000, and (b) a square planar organometallic compound corresponding to the formula:

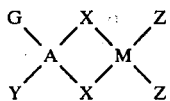

wherein M is a metal selected from either Group I B or Group VIII B of the Periodic Table, A is a substituted aromatic or heteroaromatic compound having substituents which function as a component of a bidentate ligand; X is an ortho substituent or a heteroatom which can bond to the metal; Y is either a substituted or unsubstituted amino group sulfoxy, sulfhydryl, nitro, sulfonyl, amino, thiosulfonyl, ureido, amido, ureylene, hydroxy or carboxy; G is either hydrogen or any Y, and Z is, each, independently, a monodentate ligand or bonding sites within a multidentate ligand.

* * * * *